(12) United States Patent
Dadam et al.

(10) Patent No.: US 10,928,275 B1
(45) Date of Patent: Feb. 23, 2021

(54) SYSTEMS AND METHODS FOR COORDINATING ENGINE-OFF VEHICLE DIAGNOSTIC MONITORS

(71) Applicant: Ford Global Technologies, LLC, Dearborn, MI (US)

(72) Inventors: Sumanth Reddy Dadam, Dearborn, MI (US); Robert Roy Jentz, Westland, MI (US); Adam Joseph Krach, Canton, MI (US); Douglas Raymond Martin, Canton, MI (US); Allen Lehmen, Howell, MI (US); Rohit Bhat, Farmington Hills, MI (US); John Eric Rollinger, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/686,574

(22) Filed: Nov. 18, 2019

(51) Int. Cl.
| | |
|---|---|
| *G01M 15/04* | (2006.01) |
| *F01N 11/00* | (2006.01) |
| *G07C 5/00* | (2006.01) |
| *G07C 5/02* | (2006.01) |

(52) U.S. Cl.
CPC ......... *G01M 15/042* (2013.01); *F01N 11/007* (2013.01); *G07C 5/004* (2013.01); *G07C 5/02* (2013.01)

(58) Field of Classification Search
CPC .... G01M 15/042; F01N 11/007; G07C 5/004; G07C 5/02
USPC ........................................................ 701/101
See application file for complete search history.

(56) References Cited

U.S. PATENT DOCUMENTS

| | | | |
|---|---|---|---|
| 6,830,027 B1 * | 12/2004 | Segawa ............... | F02D 41/0087 123/198 F |
| 7,921,709 B2 | 4/2011 | Doering et al. | |
| 8,006,670 B2 | 8/2011 | Rollinger et al. | |
| 2010/0145562 A1 | 6/2010 | Moran | |
| 2013/0013165 A1 | 1/2013 | Doering et al. | |
| 2013/0166182 A1* | 6/2013 | Suzuki ..................... | B60K 6/48 701/110 |
| 2014/0058597 A1* | 2/2014 | Park ...................... | F01N 11/007 701/22 |
| 2014/0245823 A1 | 9/2014 | Melzig | |

(Continued)

FOREIGN PATENT DOCUMENTS

| | | | | |
|---|---|---|---|---|
| DE | 102008001099 A1 | 10/2009 | | |
| WO | WO-2015071755 A1 * | 5/2015 | ......... | F02D 41/0005 |
| WO | WO-2016136818 A1 * | 9/2016 | ......... | F02D 41/1463 |

*Primary Examiner* — Mahmoud Gimie
(74) *Attorney, Agent, or Firm* — Geoffrey Brumbaugh; McCoy Russell LLP

(57) ABSTRACT

Methods and systems are provided for improving completion rates for engine system diagnostics for hybrid electric vehicles. In one example, a method may include in response to fueling of the engine of a hybrid electric vehicle being discontinued, establishing an air flow from an intake to an exhaust of the engine by relying on an electric motor to rotate the engine unfueled, and conducting a plurality of diagnostic monitors that rely on the air flow prior to reactivation of fueling of the engine. In this way, diagnostic monitor completion rates may be improved for hybrid electric vehicles, and fuel economy may be improved by coordinating the plurality of diagnostic monitors to be conducted during times when the engine is not fueled.

20 Claims, 16 Drawing Sheets

(56) References Cited

U.S. PATENT DOCUMENTS

| | | | | |
|---|---|---|---|---|
| 2014/0316621 A1* | 10/2014 | Martin | ............... | G01M 15/042 |
| | | | | 701/22 |
| 2014/0316622 A1* | 10/2014 | Martin | ................. | F02P 23/04 |
| | | | | 701/22 |
| 2017/0282817 A1* | 10/2017 | Murase | ............... | B60W 10/06 |
| 2019/0024599 A1 | 1/2019 | Dudar | | |
| 2019/0176810 A1 | 6/2019 | Dudar | | |

* cited by examiner

| Diagnostic | # events for diagnostic completion |
|---|---|
| DCMS | 3 |
| PF hose | 1 |
| UEGO | 1 |
| EGR | 3 |
| CATMN | 3 |

FIG. 13

SYSTEMS AND METHODS FOR COORDINATING ENGINE-OFF VEHICLE DIAGNOSTIC MONITORS

FIELD

The present description relates generally to methods and systems for conducting a number of vehicle diagnostics based on prioritization schemes during engine pull-down events where the engine is rotated unfueled to provide air flow for conducting the diagnostics.

BACKGROUND/SUMMARY

Reduced engine operating times in hybrid electric vehicles (HEVs) may result in benefits such as reduced fuel consumption and reduced fuel emissions. However, limited engine operating times may result in insufficient time to complete various on board diagnostics that rely on some level of engine operation to be conducted.

One example approach for enabling completion of onboard diagnostic routines involves maintaining or resuming engine combustion for a period of time to complete the routines. However, the inventors herein have recognized potential problems with such an approach. For example, operating an engine in a combusting mode to complete diagnostic routines may reduce fuel economy. As another example, engine operation may be requested a number of times during a drive cycle in order to complete the desired number of diagnostic routines. Repeated requests for engine operation may be counter-intuitive and potentially disturbing to an operator of the vehicle. For example, a vehicle operator desiring to operate the vehicle in an electric mode may be dissatisfied with repeated engine operations that are not due to an operator torque request.

It is herein recognized that, given the above-mentioned issues, it may be advantageous for hybrid electric vehicles to conduct diagnostics that are usually conducted during fueled engine operating conditions, instead during unfueled engine operating conditions. As one example, the engine may be rotated unfueled to provide sufficient air flow for conducting particular diagnostics. Unfueled engine rotation may be carried out via reliance on an electric machine of the hybrid electric vehicle, for example. However, such action may face similar undesirable issues as those discussed above for conducting diagnostics in an engine-combusting mode of operation. For example, unfueled engine rotation may consume energy (e.g., energy stored in a battery), which may thereby reduce fuel economy in similar fashion as a situation where the engine is pulled up (e.g., activated in a combusting mode of engine operation) to conduct a particular diagnostic. Given a number of diagnostics that have to be carried out during individual drive cycles in order to meet mandated diagnostic completion rates, repeated requests for unfueled engine rotation for diagnostic purposes may degrade fuel economy and may contribute to customer dissatisfaction.

The inventors have herein recognized the above-mentioned issues, and have developed systems and methods to at least partially address them. In one example, a method comprises in response to fueling of an engine of a vehicle being discontinued due to a first vehicle deceleration request, maintaining the engine rotating to provide an air flow from an intake of the engine to an exhaust of the engine, and conducting a plurality of diagnostic monitors that rely on the air flow while the engine is rotating prior to reactivation of fueling of the engine. In this way, completion rates for the plurality of diagnostics may be improved, which may in turn improve customer satisfaction and reduce opportunity for degradation of componentry associated with a vehicle engine system.

In one example of the method, maintaining the engine rotating may include commanding an electric motor to rotate the engine unfueled for a predetermined duration, and then discontinuing rotating the engine unfueled so that the engine spins to rest responsive to the predetermined duration elapsing. In some examples, the predetermined duration may be selected as a function of the plurality of diagnostic monitors requested to be conducted. Furthermore, maintaining the engine rotating may include rotating the engine at a predetermined speed, where the speed may be a speed selected from between 600 RPM and 2000 RPM, for example. By conducting the plurality of diagnostics while the electric motor is rotating the engine unfueled, energy usage may be improved as compared to a situation where individual diagnostic monitors are conducted at different engine pulldown events.

As another example, the method may include conducting the plurality of diagnostic monitors according to a prioritization schedule where each of the plurality of diagnostic monitors is assigned a priority that dictates an order in which each of the plurality of diagnostic monitors is conducted. In such an example, the method may further comprise adjusting the prioritization schedule for conducting the plurality of diagnostic monitors responsive to a subsequent vehicle deceleration request during a same drive cycle as the first vehicle deceleration request. As one example, adjusting the prioritization schedule may be based on a determination of degradation inferred by one or more of the plurality of diagnostic monitors. As another example, adjusting the prioritization schedule may be based on one or more of the plurality of diagnostic monitors being interrupted by a vehicle acceleration request. As yet another example, adjusting the prioritization schedule may be based on a number of times during a drive cycle that each of the plurality of diagnostics is requested to be conducted.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 13 illustrates how many times each diagnostic monitor may be conducted in order to infer a passing or a failing result for each diagnostic monitor relevant to the present disclosure;

DETAILED DESCRIPTION

Figure 1:
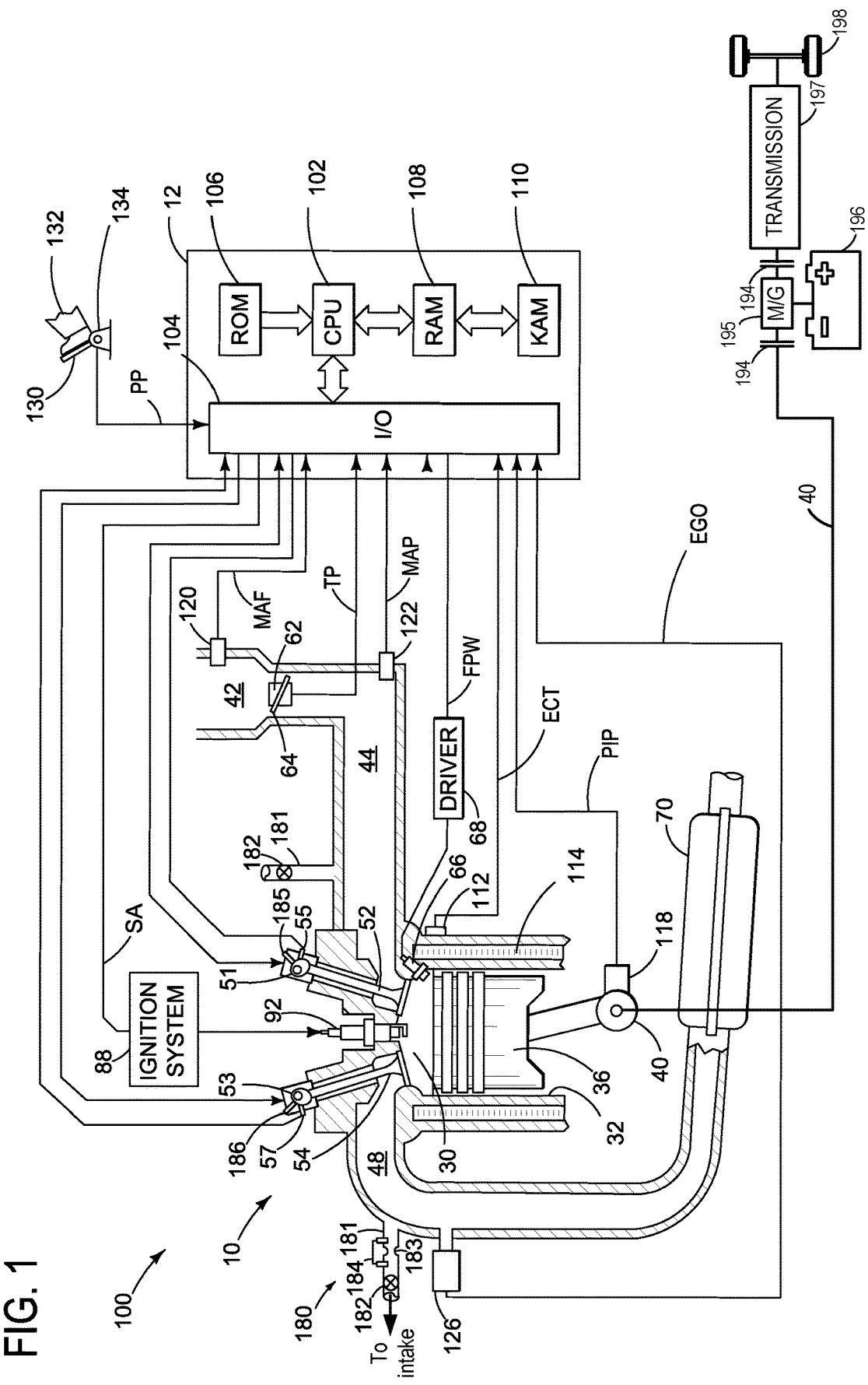
FIG. 1 shows a schematic depiction of an internal combustion engine with an exhaust system having an exhaust aftertreatment device.
Figure 2:
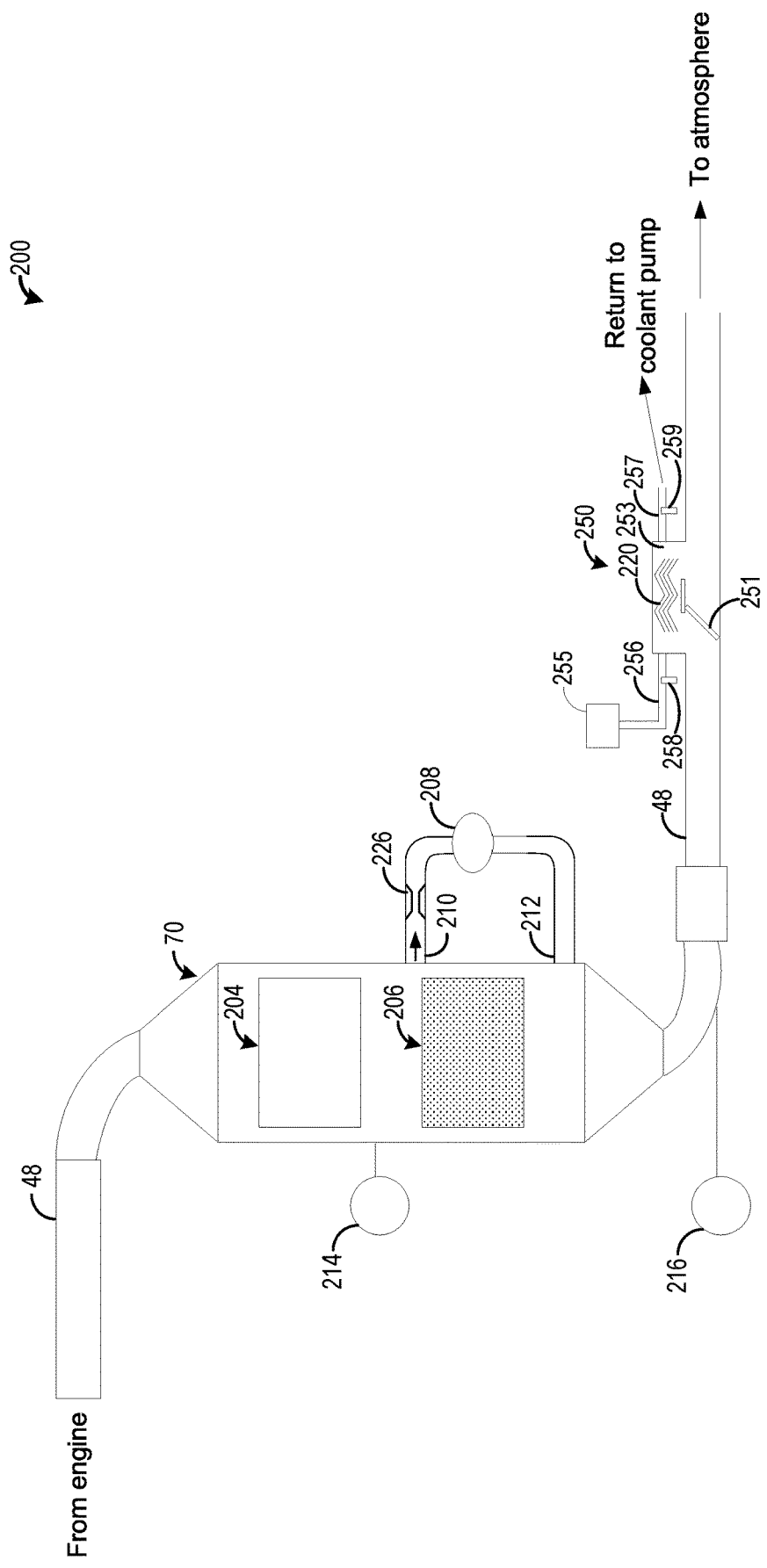
FIG. 2 shows a detailed view of the exhaust system of FIG. 1.
Figure 3:
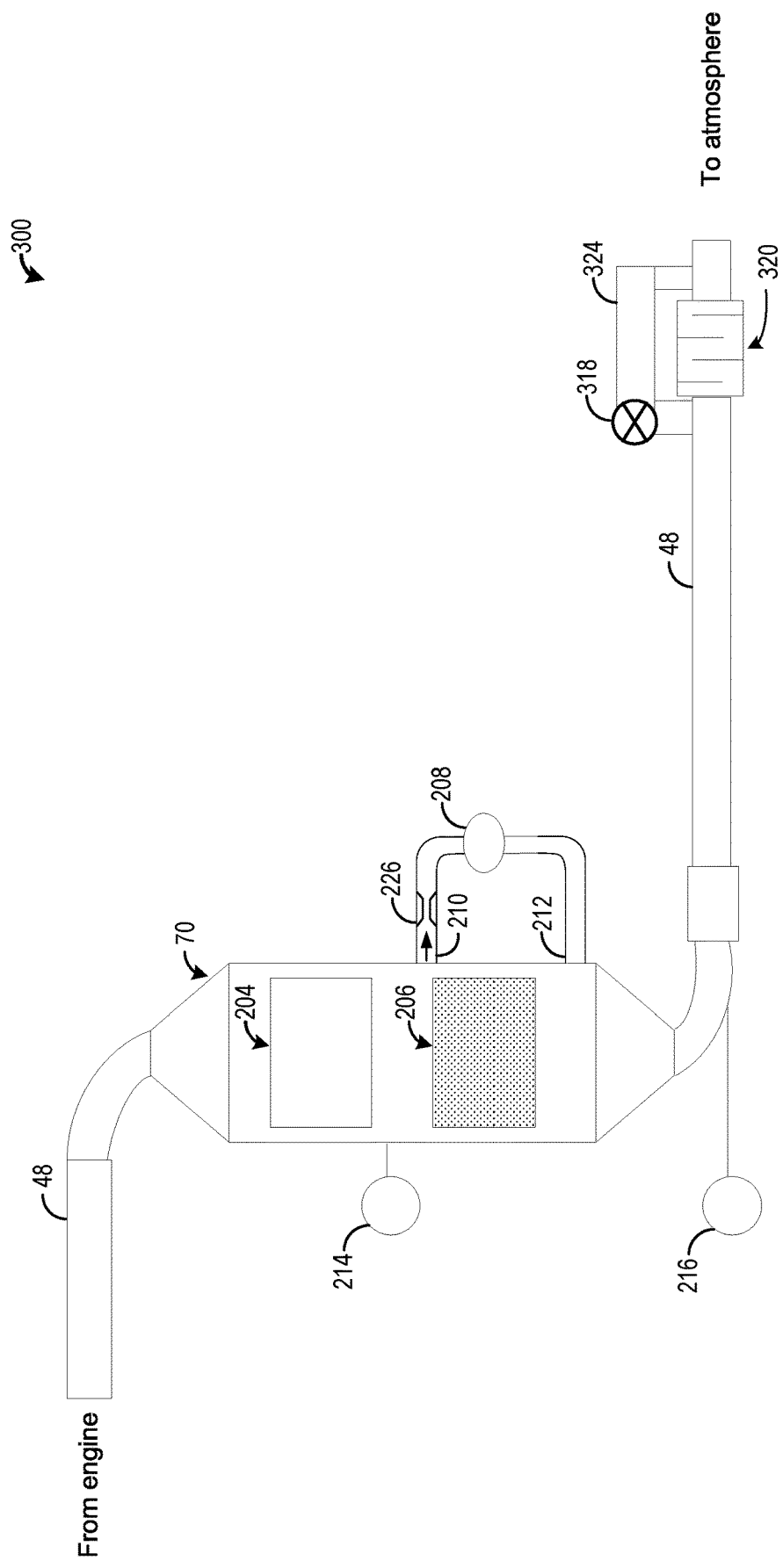
FIG. 3 shows another example view of the exhaust system of FIG. 1.
Figure 4:
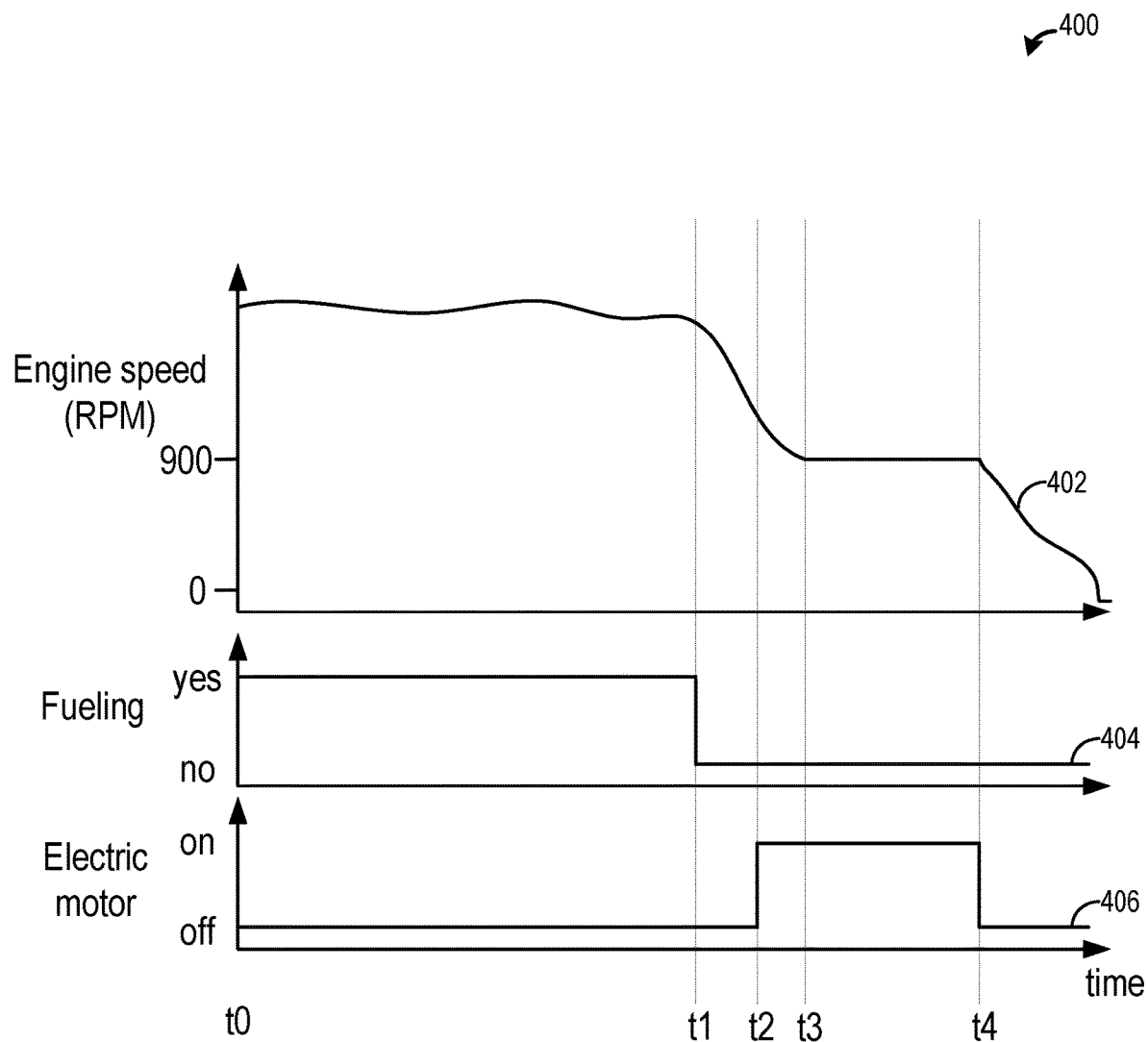
FIG. 4 depicts a prophetic example timeline detailing how an engine pulldown event can be interrupted by an inhibit engine pulldown event in order to conduct requested diagnostic monitors.

The following description relates to systems and methods for improving completion rates for a plurality of diagnostics requested for a hybrid electric vehicle and reducing an impact that conducting the plurality of diagnostics have on energy usage and customer/operator comfort. Accordingly, as the plurality of diagnostics discussed herein are relevant to hybrid electric vehicles, FIG. 1 depicts an example engine system associated with a hybrid electric vehicle system. FIGS. 2-3 depict two different embodiments of exhaust systems associated with the engine system of FIG. 1. As discussed herein, conducting the plurality of diagnostics may involve establishing an air flow from an intake of the engine to an exhaust of the engine, by rotating the engine unfueled via an electric motor responsive to a deceleration fuel shut off request. Accordingly, FIG. 4 depicts a prophetic example timeline illustrating how an engine pulldown event may be interrupted (e.g., via an inhibit pulldown, or IPD, event) in order to generate the air flow mentioned above for conducting the plurality of diagnostic monitors relevant to the present disclosure.

Figure 5A:
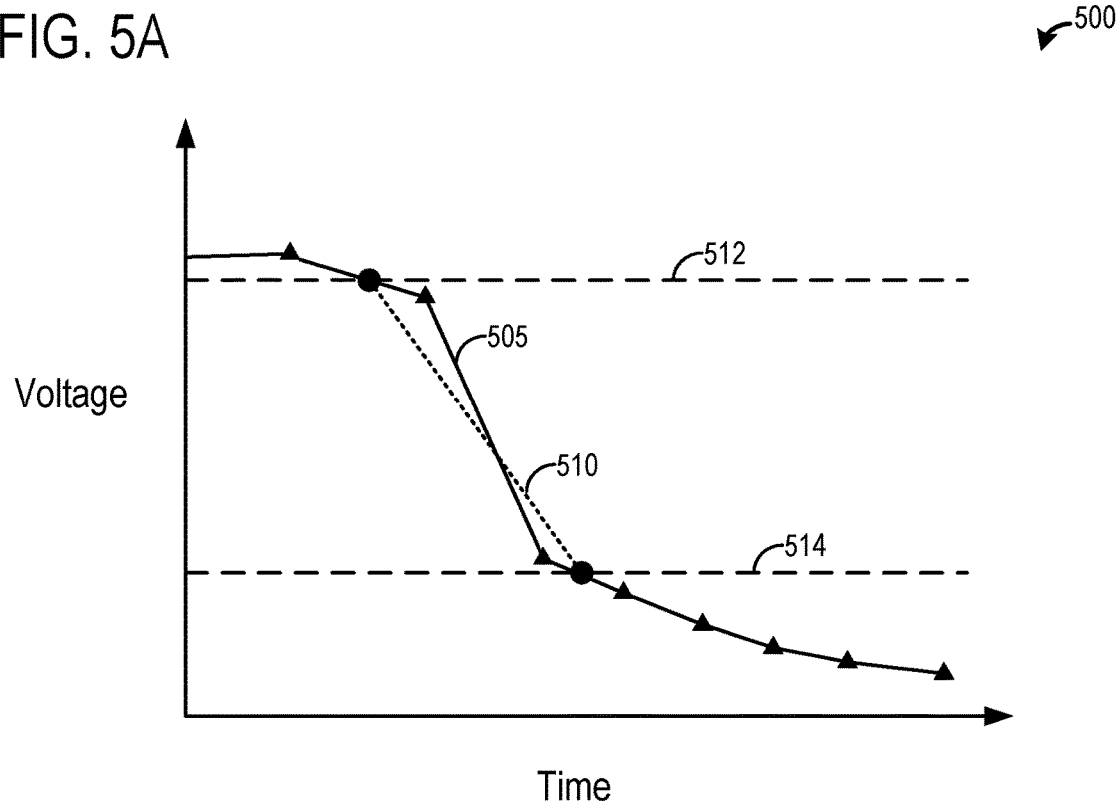
FIGS. 5A-5B depict example illustrations showing how a diagnostic for a catalyst monitor sensor may be conducted, according to the present disclosure.
Figure 5B:
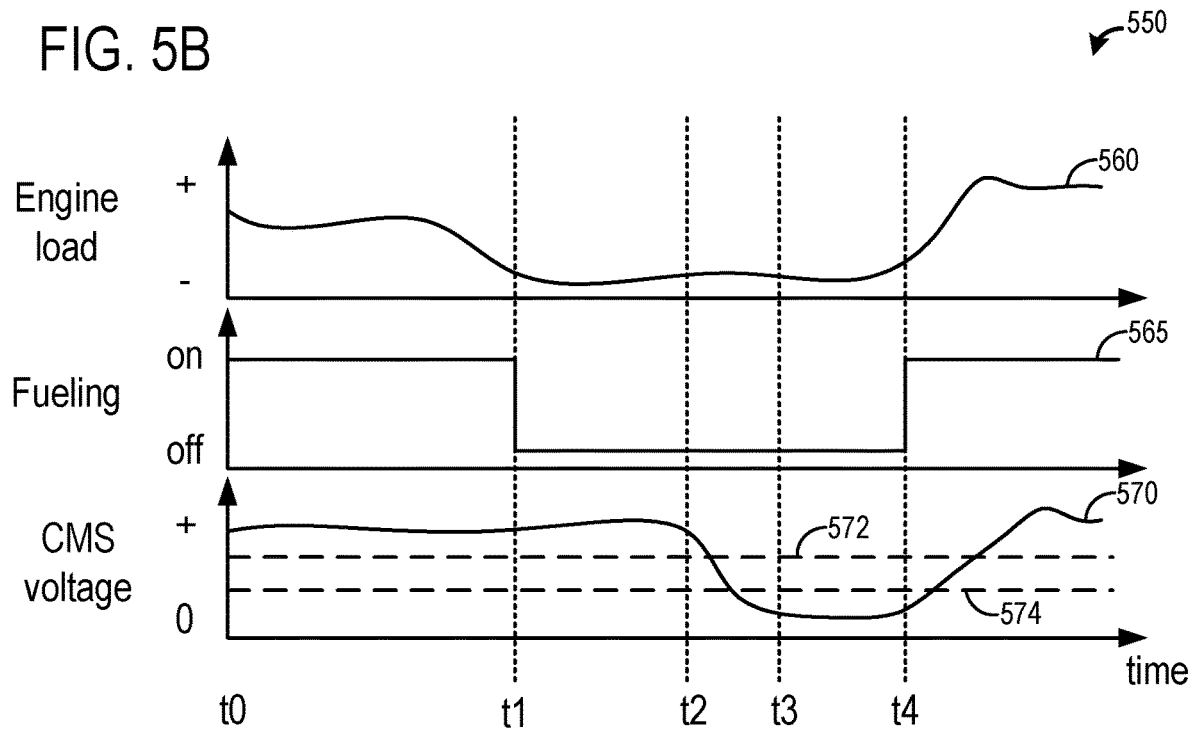

One example diagnostic monitor relevant to the present disclosure includes a catalyst monitor sensor diagnostic, and FIGS. 5A-5B illustratively depict how such a catalyst monitor sensor diagnostic may be conducted.

Figure 6:
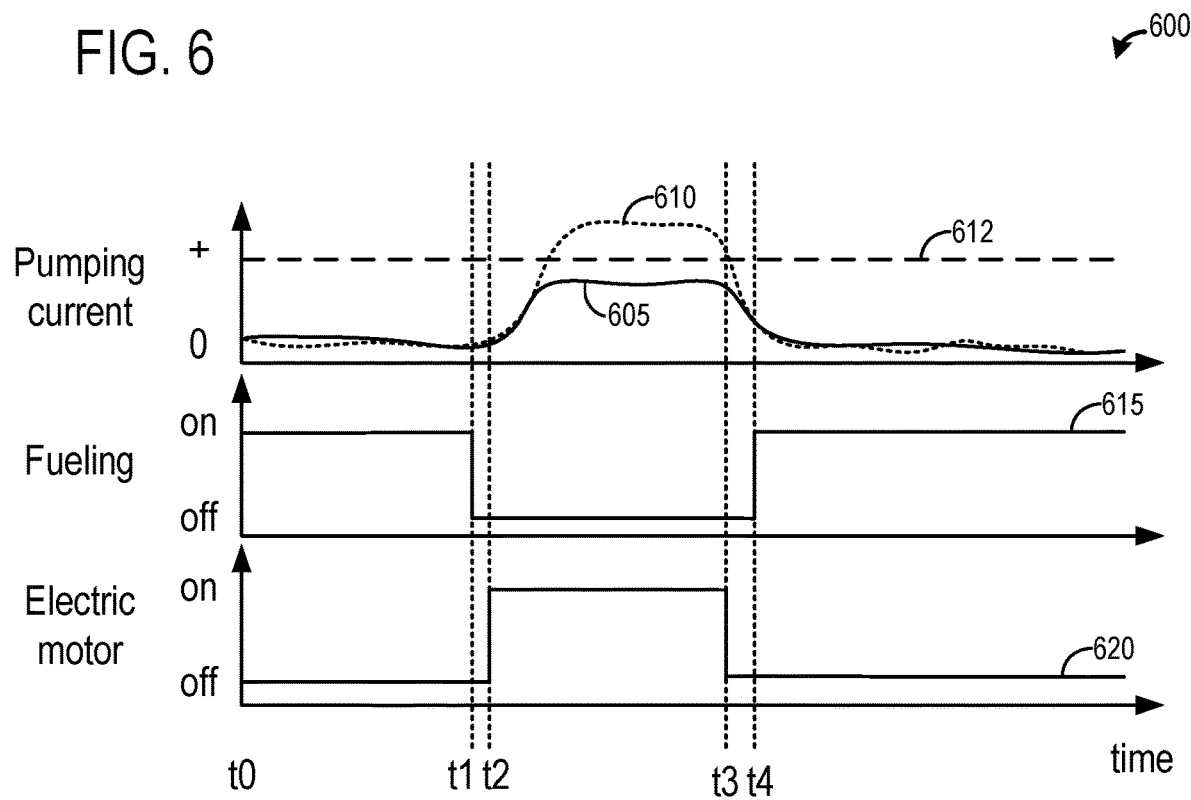
FIG. 6 depicts an example illustration showing how a universal exhaust gas oxygen sensor diagnostic monitor may be conducted, according to the present disclosure.

Another example diagnostic monitor relevant to the present disclosure includes a diagnostic for inferring whether an exhaust gas oxygen sensor (e.g., universal exhaust gas oxygen sensor, or UEGO sensor) positioned upstream of the catalyst is degraded or not. Accordingly, FIG. 6 illustratively depicts how such a UEGO sensor diagnostic monitor may be conducted.

Figure 7A:
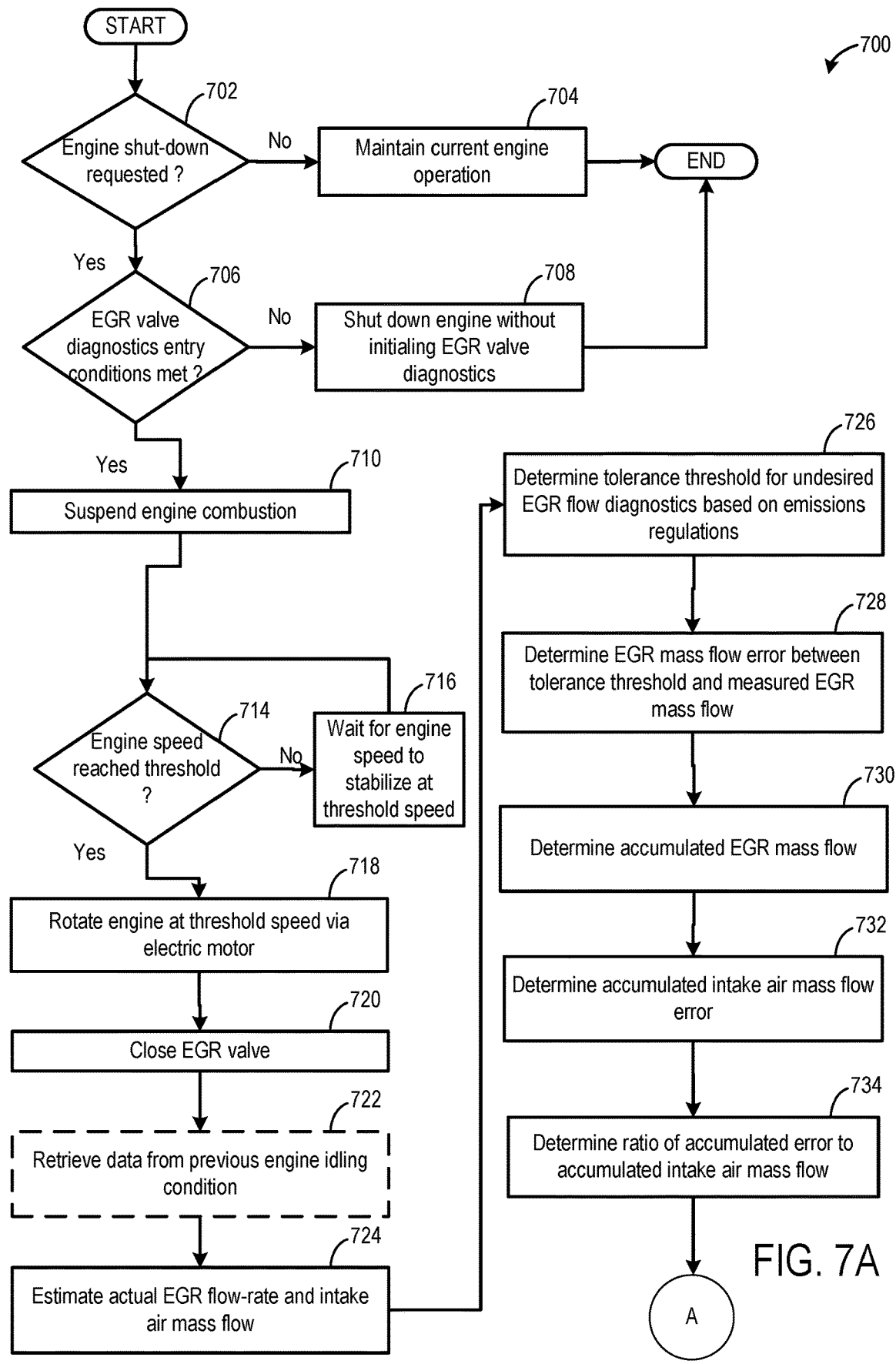
FIGS. 7A-7B depict a high-level example method for conducting an exhaust gas recirculation diagnostic monitor, according to the present disclosure.
Figure 7B:
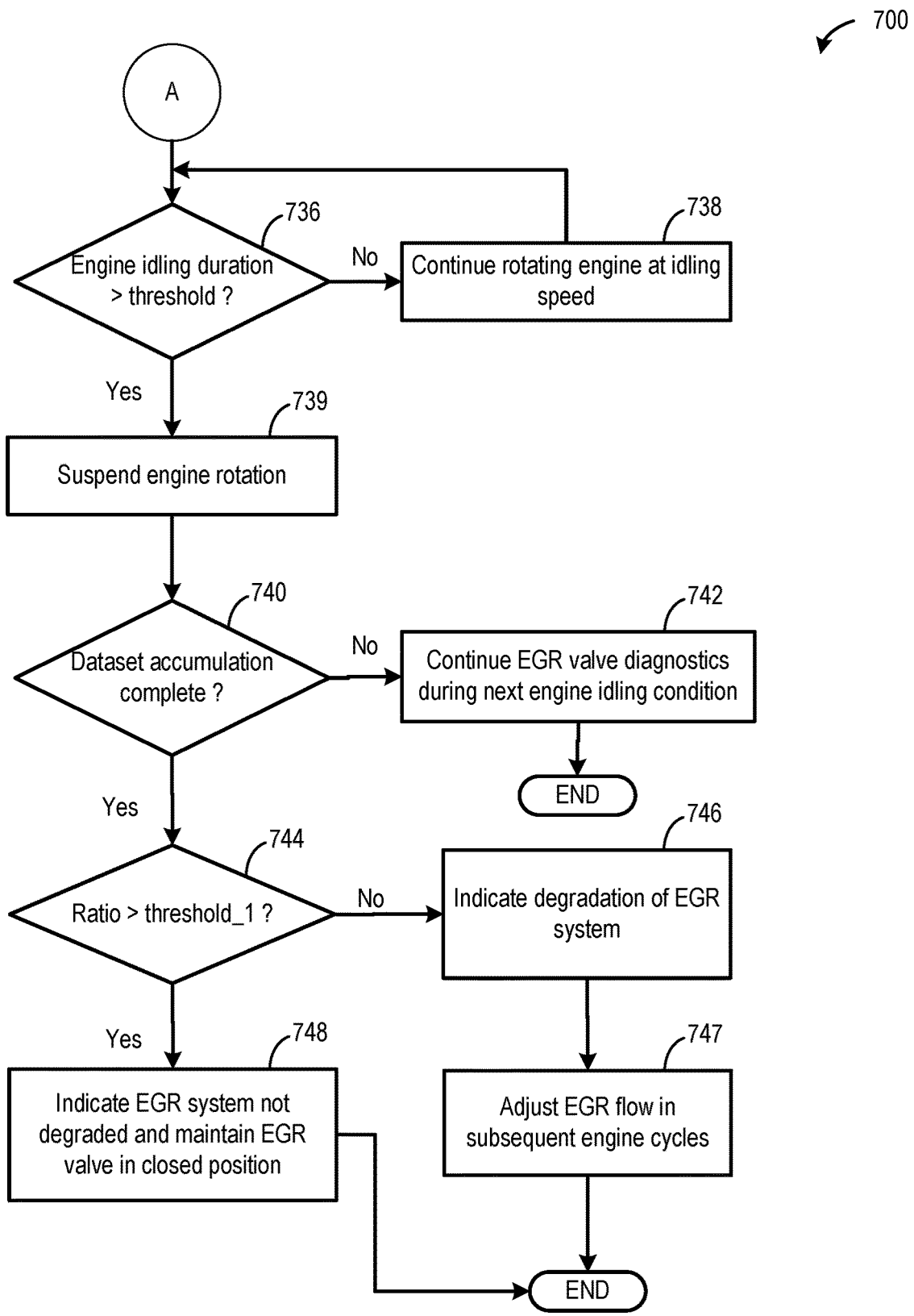
Figure 8:
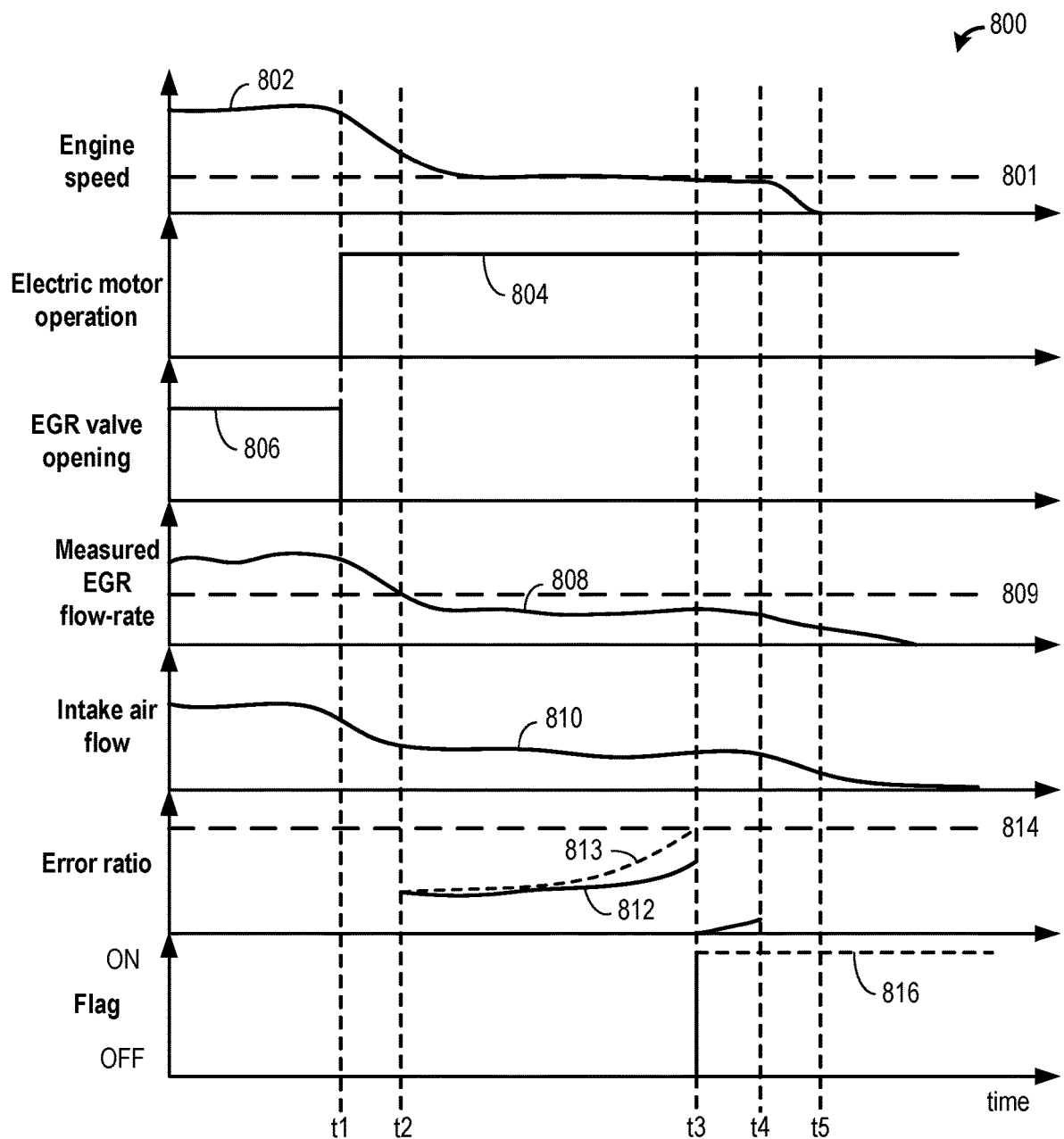
FIG. 8 depicts a prophetic example timeline detailing how the method of FIGS. 7A-7B can be used to infer a presence or an absence of degradation associated with an exhaust gas recirculation system.

Another example diagnostic monitor relevant to the present disclosure includes a monitor for determining whether there is flow through an exhaust gas recirculation system associated with the engine system of FIG. 1, under conditions where no exhaust gas recirculation flow is expected. Accordingly, FIGS. 7A-7B depict an example methodology for inferring whether there is unexpected flow through the exhaust gas recirculation system or not, and a prophetic example timeline detailing how the method of FIGS. 7A-7B may be conducted is depicted at FIG. 8.

Figure 9:
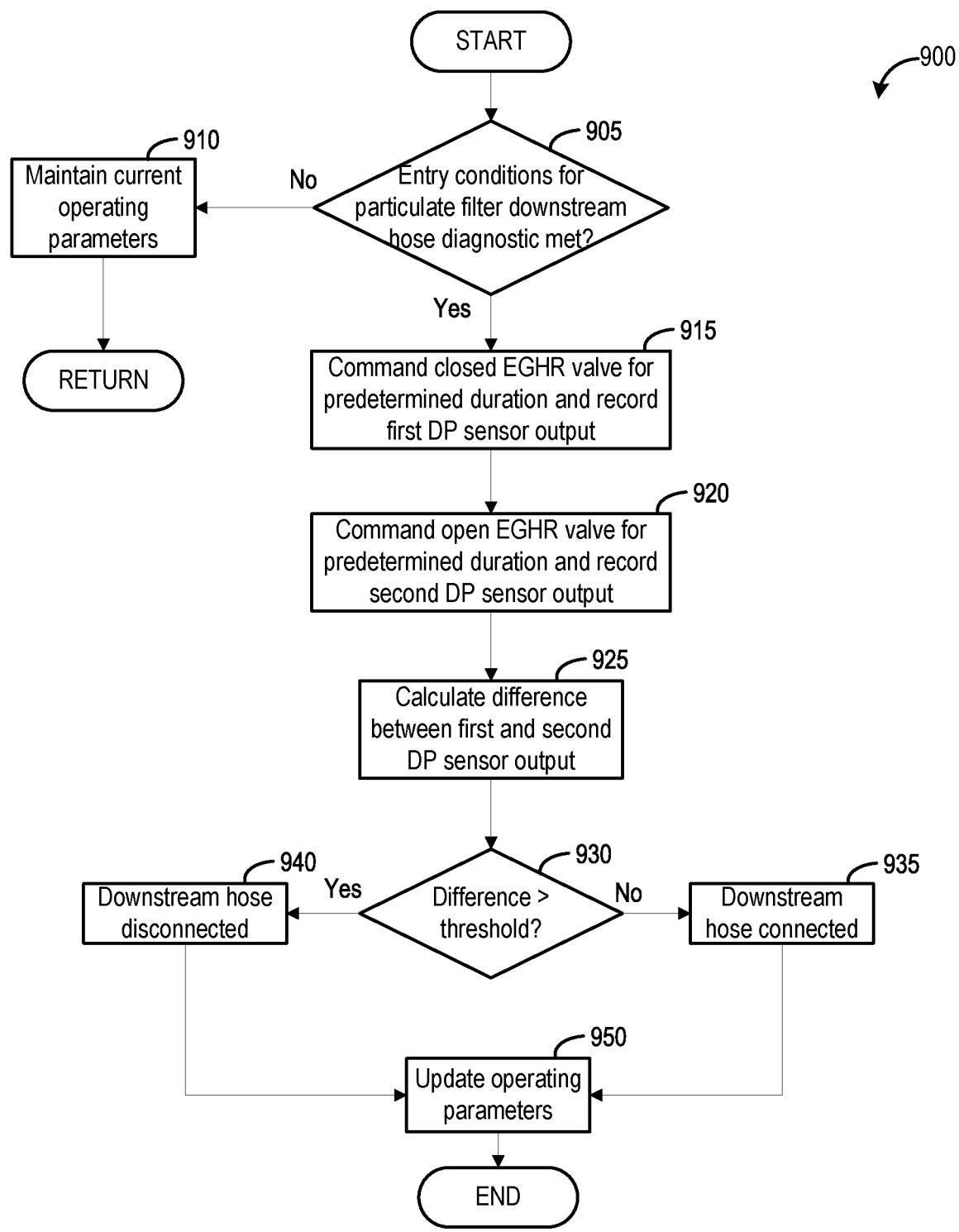
FIG. 9 depicts a high-level example method for conducting a diagnostic to ascertain whether a downstream hose associated with a differential pressure sensor configured to monitor differential pressure across a gasoline particulate filter is disconnected.
Figure 10:
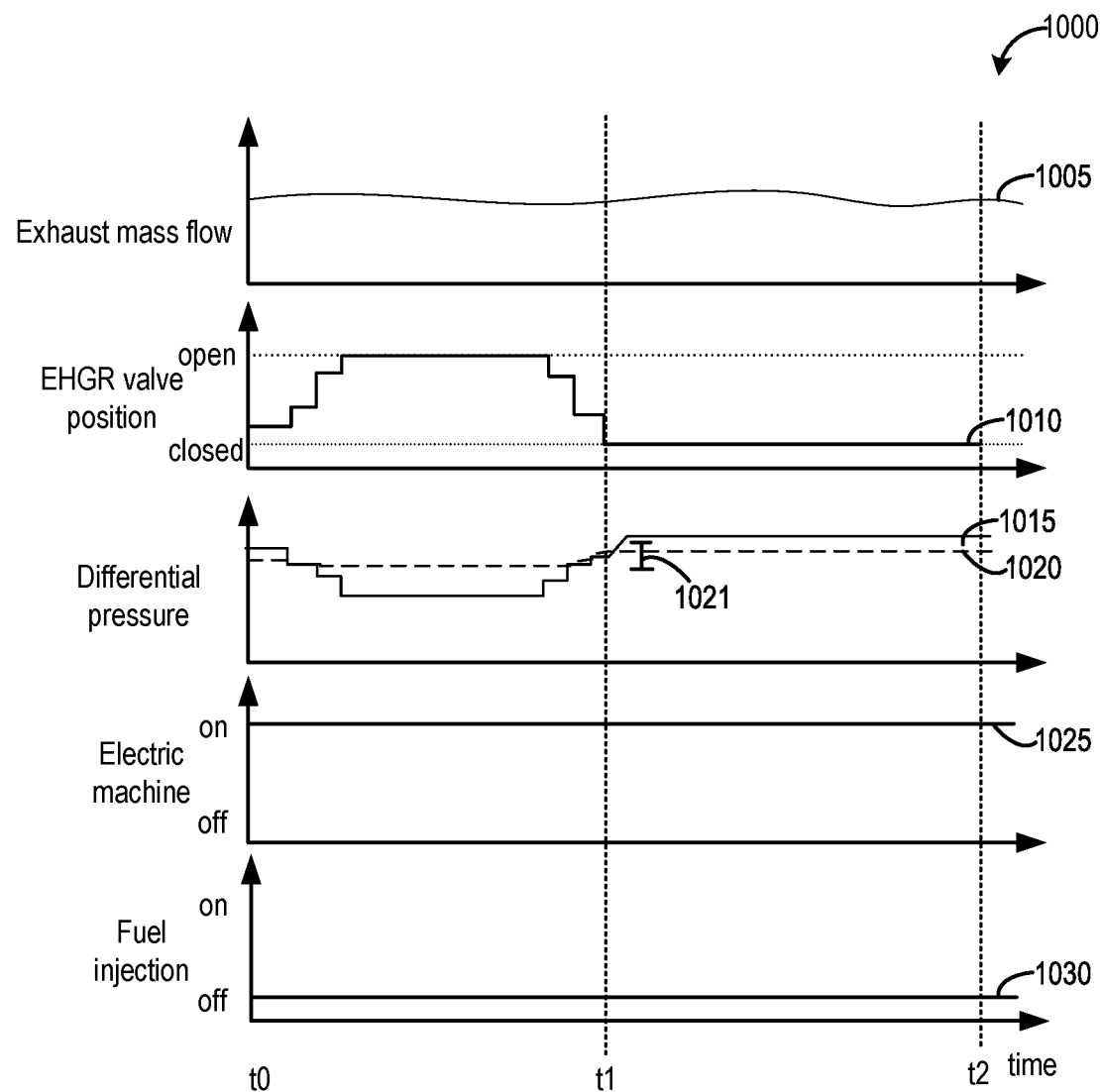
FIG. 10 depicts a prophetic example timeline illustrating how the method of FIG. 9 can be used to infer whether the downstream hose associated with the differential pressure sensor is disconnected.

Another example diagnostic monitor relevant to the present disclosure includes a monitor for inferring whether a downstream hose of a differential pressure sensor configured to monitor differential pressure across a gasoline particulate filter is disconnected, or not. Accordingly, FIG. 9 depicts an example methodology for conducting the particulate filter downstream hose diagnostic, and an example timeline illustrating how the method of FIG. 9 may be used to infer whether the downstream hose is disconnected is depicted at FIG. 10.

Figure 11:
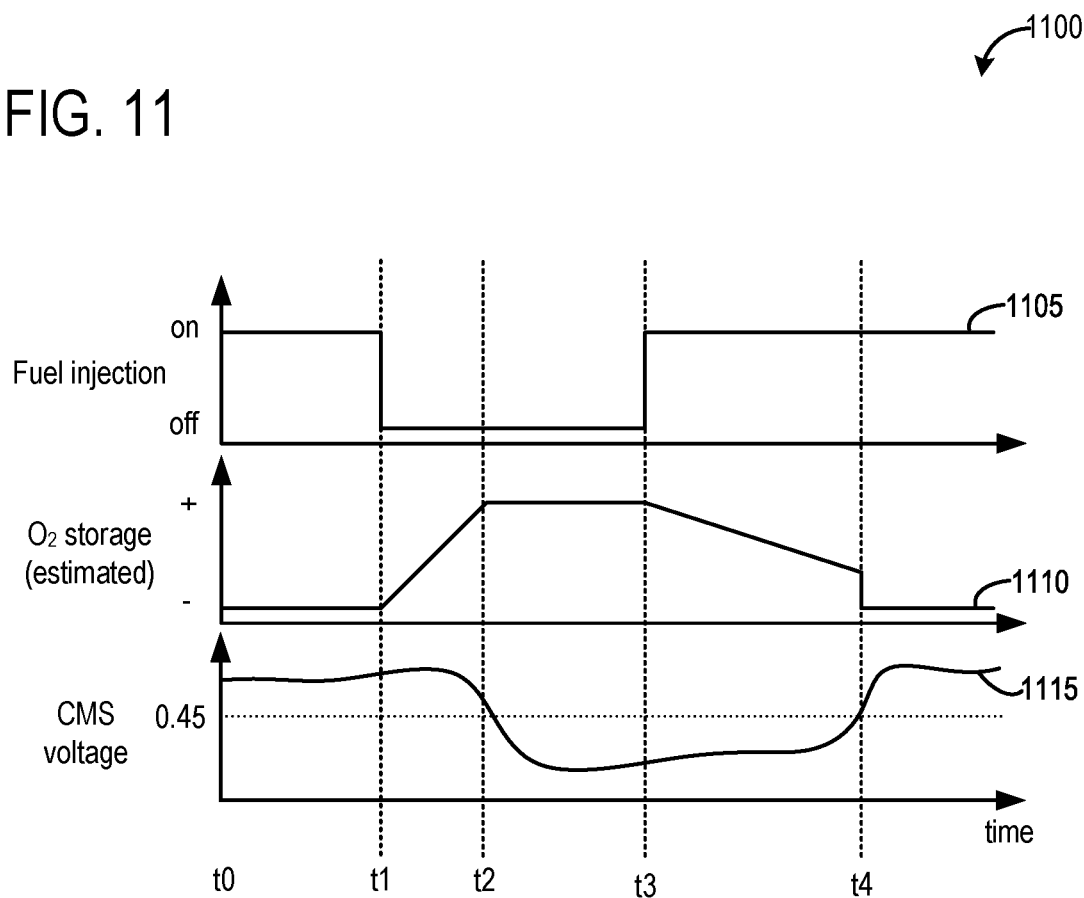
FIG. 11 depicts a prophetic example timeline illustrating how to conduct a diagnostic monitor to infer whether a catalyst in an exhaust of the engine of FIG. 1 is functioning as desired or expected.

Yet another example diagnostic monitor relevant to the present disclosure includes a monitor for inferring whether an exhaust catalyst (e.g., three-way catalyst) is functioning as desired or expected. Accordingly, an example timeline is depicted at FIG. 11, illustrating how such a monitor may be carried out.

Figure 12:
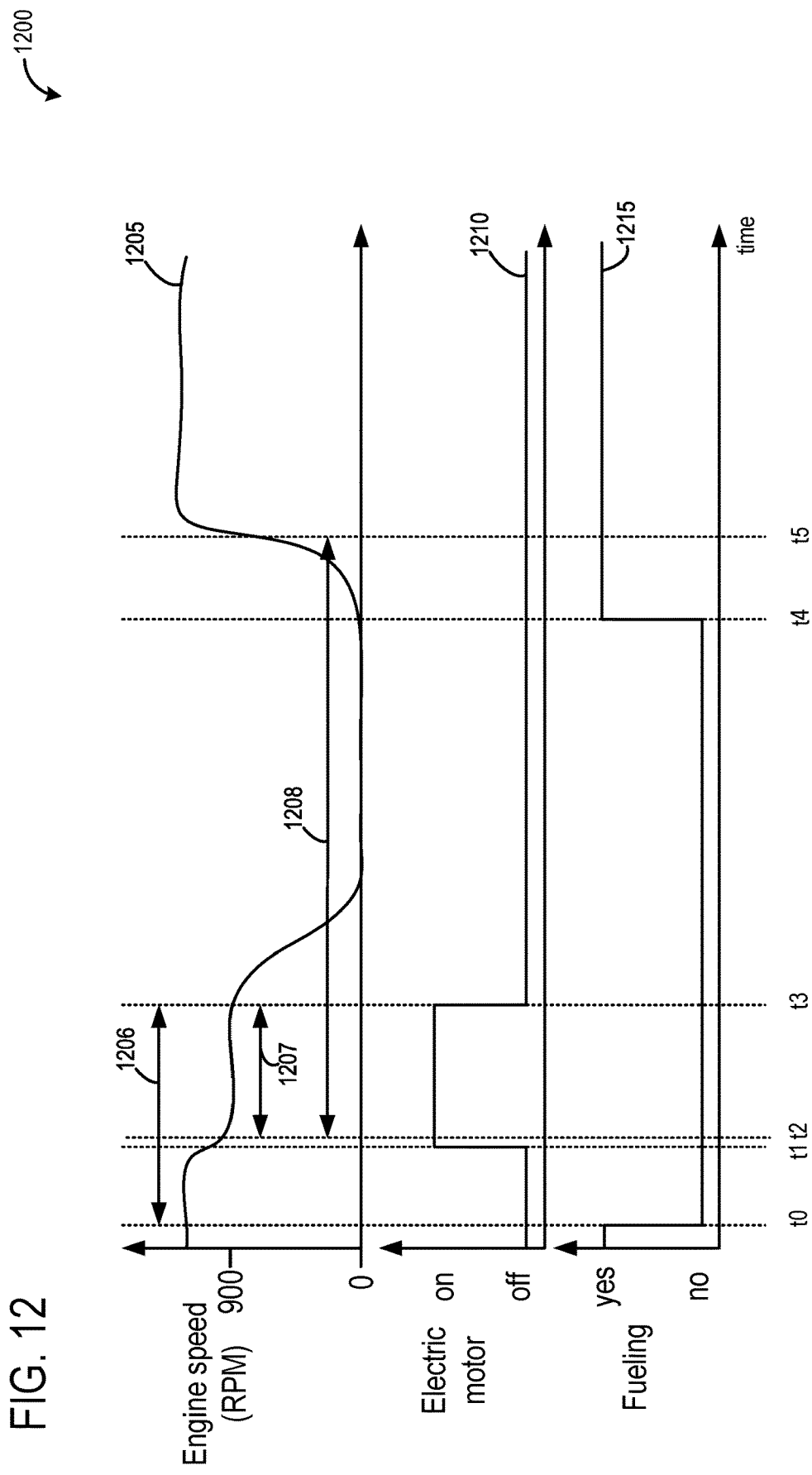
FIG. 12 depicts a prophetic example timeline illustrating how various diagnostics of the present disclosure can be conducted in response to a deceleration fuel shut off condition.
Figure 14:
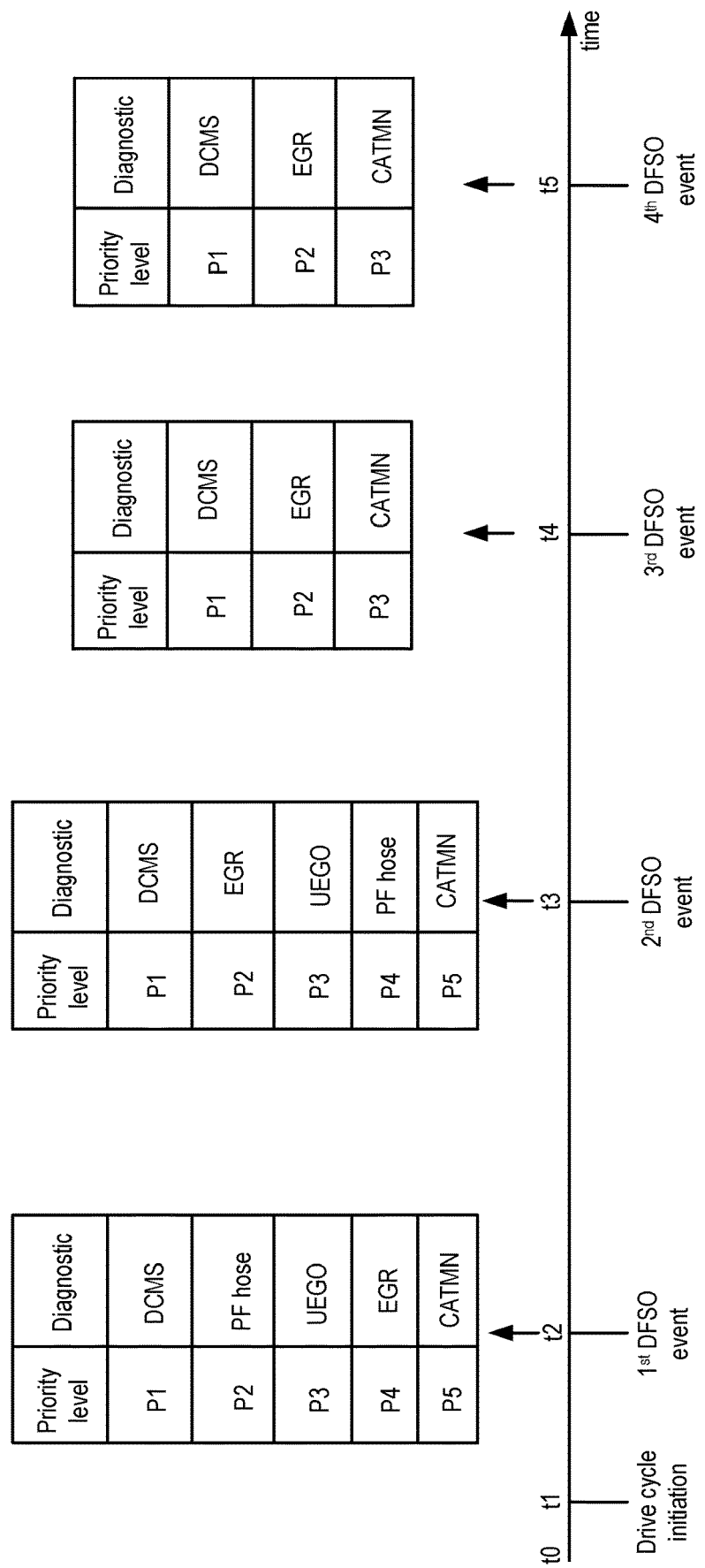
FIG. 14 depicts a prophetic example timeline showing a desired manner in which diagnostics relevant to the present disclosure may be conducted during a drive cycle, according to prioritization scheduling for the diagnostics.
Figure 15:
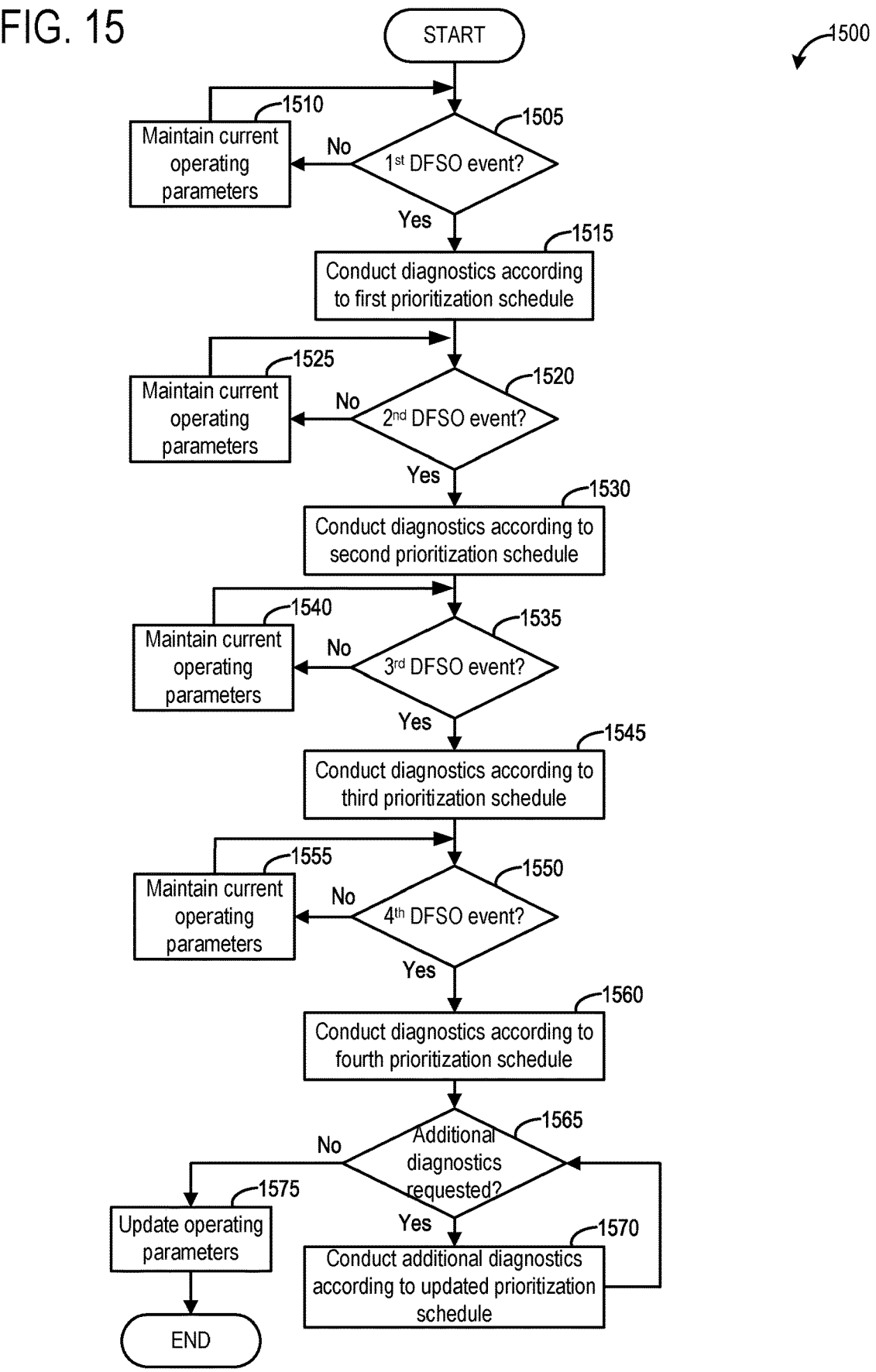
FIG. 15 depicts a high-level example method for conducting the diagnostics relevant to the present disclosure at different deceleration fuel shut off events during the course of a drive cycle, according to the prioritization schedule discussed with regard to FIG. 14.

As mentioned above, the various diagnostics relevant to the present disclosure may be conducted in a manner that allows for a plurality of the diagnostics to be conducted at each requested deceleration fuel shut off event. Accordingly, a prophetic example timeline is depicted at FIG. 12, illustrating appropriate times during a deceleration fuel shut off event where the plurality of diagnostics relevant to the present disclosure may be conducted. In order for a controller of the vehicle to infer a passing (e.g., absence of degradation) or a non-passing (e.g., presence of degradation) result for each of the diagnostic monitors, there may be a threshold number of times that particular diagnostics have to be conducted, which is shown illustratively at FIG. 13. A prophetic example timeline at FIG. 14 illustratively shows how the various diagnostics of the present disclosure may be conducted according to a priority schedule for the diagnostics, and how the priority schedule may change during a course of a drive cycle. A high-level example method for conducting the plurality of diagnostics relevant to the present disclosure at different DFSO events, is depicted at FIG. 15.

Referring now to FIG. 1, it includes a schematic diagram showing one cylinder of a multi-cylinder internal combustion engine 10 included in vehicle system 100. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP.

Combustion cylinder 30 of engine 10 may include combustion cylinder walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion cylinder 30 may receive intake air from intake manifold 44 via intake passage 42 and may exhaust combustion gases via exhaust passage 48. Intake manifold 44 and exhaust passage 48 can selectively communicate with combustion cylinder 30 via respective intake valve 52 and exhaust valve 54. In some embodiments, combustion cylinder 30 may include two or more intake valves and/or two or more exhaust valves.

In this example, intake valve 52 and exhaust valve 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively.

Still other valve deactivation mechanisms may also be used, such as electrically actuated valves. For example, engine 10 may comprise a variable displacement engine (VDE) where each cylinder of engine 10 may be selectively deactivatable, where deactivatable refers to the ability of the controller to command both intake and exhaust valves closed for particular cylinder(s), thus sealing the particular cylinders. If fuel injection is also stopped, then such action may result in the particular cylinder(s) being essentially an air-spring. Accordingly, as depicted herein, in one embodiment, deactivation of intake valve 52 may be controlled by first VDE actuator 185 while deactivation of exhaust valve 54 may be controlled by second VDE actuator 186. In alternate embodiments, a single VDE actuator may control deactivation of both intake and exhaust valves of the deactivatable cylinder. In still other embodiments, a single cylinder valve actuator deactivates a plurality of cylinders (both intake and exhaust valves), for example all the cylinders in the deactivated bank, or a distinct actuator may control deactivation for all the intake valves while another distinct actuator controls deactivation for all the exhaust valves of the deactivated cylinders on a bank. It will be appreciated that if the cylinder is a non-deactivatable cylinder of the VDE engine, then the cylinder may not have any valve deactivating actuators.

Fuel injector 66 is shown coupled directly to combustion cylinder 30 for injecting fuel directly therein in proportion to the pulse width of signal FPW received from controller 12 via electronic driver 68. In this manner, fuel injector 66 provides what is known as direct injection of fuel into combustion cylinder 30. The fuel injector may be mounted on the side of the combustion cylinder or in the top of the combustion cylinder, for example. Fuel may be delivered to fuel injector 66 by a fuel system (not shown) including a fuel tank, a fuel pump, and a fuel rail. In some embodiments, combustion cylinder 30 may alternatively or additionally include a fuel injector arranged in intake passage 42 in a configuration that provides what is known as port injection of fuel into the intake port upstream of combustion cylinder 30.

Intake passage 42 may include a throttle 62 having a throttle plate 64. In this particular example, the position of throttle plate 64 may be varied by controller 12 via a signal provided to an electric motor or actuator included with throttle 62, a configuration that may be referred to as electronic throttle control (ETC). In this manner, throttle 62 may be operated to vary the intake air provided to combustion cylinder 30 among other engine combustion cylinders. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of exhaust aftertreatment device 70, also referred to herein as emissions control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor. Exhaust aftertreatment device 70 may include a gasoline particulate filter (GPF) and one or more emission control devices, such as a three way catalyst (TWC) coupled together or separately (explained in more detail below with respect to FIG. 2 and FIG. 3). In other embodiments, the one or more emission control devices may be a NOx trap, various other emission control devices, or combinations thereof.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. The controller 12 may receive various signals and information from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from pressure sensor 122. Storage medium read-only memory 106 can be programmed with computer readable data representing instructions executable by processor 102 for performing the method described below as well as variations thereof. The controller 12 receives signals from the various sensors of FIG. 1 and employs the various actuators of FIG. 1 to adjust engine operation based on the received signals and instructions stored on a memory of the controller.

Engine 10 may also include an exhaust gas recirculation (EGR) system 180 that receives at least a portion of an exhaust gas stream exiting engine 10 and returns the exhaust gas to engine intake manifold 44 downstream of throttle 62. Under some conditions, EGR system 180 may be used to regulate the temperature and/or dilution of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing. EGR system 180 is shown forming a common EGR passage 181 from exhaust passage 48 to intake passage 42.

In some examples, exhaust passage 48 may also include a turbocharger (not shown) comprising a turbine and a compressor coupled on a common shaft. The turbine may be coupled within exhaust passage 48, while the compressor may be coupled within intake passage 42. Blades of the turbine may be caused to rotate about the common shaft as a portion of the exhaust gas stream discharged from the engine 10 impinges upon the blades of the turbine. The compressor may be coupled to the turbine such that the compressor may be actuated when the blades of the turbine are caused to rotate. When actuated, the compressor may then direct pressurized fresh air to air intake manifold 44 where it may then be directed to engine 10. In systems where EGR passage 181 is coupled to exhaust passage 48 upstream of the turbine and coupled to intake passage 42 downstream of the compressor, the EGR system may be considered a high pressure EGR system. The EGR passage may alternatively be coupled downstream of the turbine and upstream of the compressor (low pressure EGR system). It may be understood that the systems and methods discussed herein may apply to either a high pressure EGR system or a low pressure EGR system, without departing from the scope of this disclosure.

An EGR valve 182 may be coupled within EGR passage 181. EGR valve 182 may be configured as an active solenoid valve that may be actuated to allow exhaust gas flow into intake manifold 44. The portion of the exhaust gas flow discharged by engine 10 that is allowed to return to engine 10 may be metered by the measured actuation of EGR valve 182, which may be regulated by controller 12. The actuation of EGR valve 182 may be based on various vehicle operating parameters and a calculated overall EGR flow rate.

One or more EGR coolers (not shown) may be coupled within EGR passage 181. The EGR cooler may act to lower the overall temperature of the EGR flow stream before passing the stream on to intake manifold 44 where it may be combined with fresh air and directed to engine 10. EGR passage 181 may include one or more flow restriction regions 183, also referred to herein as reference orifice 183. One or more pressure sensors 184 may be coupled at or near flow restriction region 183. In one example, pressure sensor 184 may be a differential pressure feedback exhaust (DPFE) sensor, for measuring a differential pressure across flow restriction 183. The diameter of the flow restriction region may thus be used to determine an overall volumetric flow rate through EGR passage 181.

In some examples, engine 10 may be included in a hybrid electric vehicle (HEV) or plug-in HEV (PHEV), with multiple sources of torque available to one or more vehicle wheels 198. In the example shown, vehicle system 100 may include an electric machine 195. Electric machine 195 may be a motor or a motor/generator. Crankshaft 40 of engine 10 and electric machine 195 are connected via a transmission 197 to vehicle wheels 198 when one or more clutches 194 are engaged. In the depicted example, a first clutch is provided between crankshaft 199 and electric machine 195, and a second clutch is provided between electric machine 195 and transmission 197. Controller 12 may send a signal to an actuator of each clutch 194 to engage or disengage the clutch, so as to connect or disconnect crankshaft 40 from electric machine 195 and the components connected thereto, and/or connect or disconnect electric machine 195 from transmission 197 and the components connected thereto. Transmission 197 may be a gearbox, a planetary gear system, or another type of transmission. The powertrain may be configured in various manners including as a parallel, a series, or a series-parallel hybrid vehicle.

Electric machine 195 receives electrical power from a traction battery 196 to provide torque to vehicle wheels 198. Electric machine 195 may also be operated as a generator to provide electrical power to charge traction battery 196, for example during a braking operation.

FIG. 2 schematically shows a detailed view of an exhaust system 200 coupled to the engine of FIG. 1. Exhaust system 200 includes exhaust passage 48 and exhaust aftertreatment device 70. Exhaust aftertreatment device 70 includes a three way catalyst 204 (e.g., catalytic converter) and gasoline particulate filter 206 mounted in a common housing. According to one embodiment of the present disclosure, the TWC 204 may be positioned upstream of the GPF 206 and may function to reduce emissions by allowing catalytic oxidation of CO and hydrocarbons while simultaneously performing catalytic reduction of NOx. The catalyst material may include noble metals such as platinum, palladium, and/or rhodium. The exhaust gases that have been processed by passage through the TWC may then be filtered for particulate matter before expulsion into the atmosphere. As used herein, "upstream" and "downstream" may be relative to a direction of exhaust gas flow. For example, the TWC 204 being upstream of the GPF 206 includes the TWC receiving exhaust gas from the engine and flowing the exhaust gas to the GPF.

GPF 206 may comprise of heat-resistant porous filter walls formed by ceramics, metallic fiber cloth, or other materials and structures that inhibit the path of particulate matter but do not completely enclose the exhaust gas and force it through a porous path. Further still, the structures may be arranged in strata or layers. Exhaust gases discharged from the exhaust port of cylinder 30 may flow into the exhaust passage 48 and pass through the GPF, and in the process, particulate matter may get deposited/filtered by the GPF. GPF 206 may function to retain residual soot exhausted from engine 10 to reduce emissions. In some examples, the retained particulates may further be oxidized to produce $CO_2$ in a forced regeneration process performed during engine operation.

While the depicted embodiment shows TWC device 204 positioned upstream of GPF 206, in an alternate embodiment, the TWC or alternatives thereof, could be positioned downstream of the particulate matter filter. In a still further embodiment, the filter substrate may include a catalytic coating comprising a one or more layer(s) of a three-way catalyst.

Exhaust passage 48 may receive exhaust gases from other cylinders of engine 10 in addition to cylinder 30. A plurality of sensors may be coupled to the exhaust system that includes the exhaust aftertreatment device 70. Exhaust temperature may be estimated by one or more temperature sensors such as temperature sensor 216 located downstream of the exhaust aftertreatment device 70. Alternatively or additionally, exhaust temperature may be inferred based on engine operating conditions such as speed, load, air-fuel ratio (AFR), spark retard, etc. A catalyst monitor sensor (CMS) 214 may be connected in the exhaust aftertreatment device 70 downstream of the TWC 204 and downstream of the pre-catalyst oxygen sensor (such as the UEGO sensor 126) to monitor the conversion efficiency of the TWC 204. A suitable number of exhaust gas sensors may be utilized including lambda sensors or proportional oxygen sensors to monitor catalyst performance.

A differential pressure (DP) sensor 208 is coupled to the exhaust aftertreatment device 70, across the GPF 206. According to an embodiment of the disclosure, the DP sensor 208 is connected to both an upstream side of the GPF via an upstream hose 210 and a downstream side of the GPF via a downstream hose 212. The upstream hose 210 includes a first end that connects to the DP sensor and a second end that connects upstream of the GPF 206 (and downstream of the TWC 204) in the exhaust aftertreatment device. The downstream hose 212 includes a first end that connects to the DP sensor and a second end that connects downstream of the GPF 206 in the exhaust aftertreatment device.

In one example, the upstream hose 210 may include a small orifice 226 positioned in the flow path of the upstream exhaust such that orifice 226 may act as a mechanical low-pass filter, reducing pressure or exhaust flow variations and thus resulting in a smooth signal from the DP sensor. The presence of the orifice in the upstream hose may even out upstream pressure fluctuations commonly seen in high exhaust flow conditions and subsequently allow for a leveled out signal from the DP sensor.

While the upstream hose 210 and downstream hose 212 are illustrated in FIG. 2 as each being coupled to the exhaust aftertreatment device 70, in some examples one or more of the upstream hose 210 and downstream hose 212 may be coupled to the exhaust passage 48. For example, rather than fluidically coupling to the housing of the aftertreatment device 70, the upstream hose 210 and/or downstream hose 212 may fluidically couple to the exhaust passage 48 downstream of the GPF 206.

Thus, the differential pressure sensor 208 sees both upstream pressure and downstream pressure across the GPF 206 and the output of the DP sensor 208 is differential pressure. The differential pressure between the upstream and downstream sides of the GPF 206 increases in relation to an increase in the relative amount of particulate matter that accumulates in the particulate filter as exhaust gases continue to flow through. Controller 12 may thus be configured to estimate an amount of particulate matter accumulated in the GPF 206 based on the output of the DP sensor. In some embodiments, an absolute pressure sensor (not shown) may be coupled to the particulate filter at a certain position in the exhaust passage, to provide an estimate of the backpressure generated therein and an estimate of the filter load. In still other embodiments, pressure sensors may be coupled upstream and downstream of the filter, and the filter load may be based on the estimated pressure difference across the filter. In some examples, the differential pressure measured by the DP sensor may also be influenced by the various components that may be coupled in the upstream and downstream hose connections of the particulate filter, such as the orifice described above.

Downstream of exhaust device 70 is exhaust gas heat recovery (EGHR) system 250, which functions to turn thermal losses in the exhaust pipe into energy. As one example, EGHR system 250 may be used to capture waste heat in engine coolant. This may enable faster coolant warmup time, for example. Accordingly, depicted is heat exchanger 220, positioned in heat recovery conduit 253. Heat exchanger 220 may function to effectively transfer exhaust heat to engine coolant, as mentioned. Thus, depicted is engine coolant pump 255, first coolant line 256 leading to heat exchanger 220 and second coolant line 257 leading away from heat exchanger 220. A first temperature sensor 258 may be included in first coolant line 256 and a second temperature sensor 259 may be included in second coolant line 257. EGHR system 250 includes EGHR valve 251.

EGHR valve 251 may be a continuously variable valve, for example, for continuous control over exhaust gas flow. EGHR valve 251 may be under control of the controller (e.g. controller 12 at FIG. 1), and may function to regulate an amount of exhaust gas that flows through heat recovery conduit 253, as a function of vehicle operating conditions. Discussed herein, when EGHR valve 251 is in a fully closed position, it may be understood that all exhaust gas flows through exhaust passage 48 (and not through heat recovery conduit 253) to atmosphere. Alternatively, when EGHR valve 251 is in a fully open position, it may be understood that at least a portion of exhaust gas may flow through heat recovery conduit 253 and then to atmosphere. In some examples, when EGHR valve 251 is in the fully open position, all of the exhaust gas may flow through heat recovery conduit 253.

During engine operation, exhaust gases flow from the exhaust passage 48 into the exhaust aftertreatment device 70. In accordance with one embodiment of the disclosure, in the exhaust aftertreatment device 70, the exhaust first passes through TWC 204 that functions to remove CO, hydrocarbons, and NOx. A catalyst sensor such as CMS 214 may be positioned in the exhaust aftertreatment device 70 downstream of the TWC 204 to monitor the exhaust and/or the efficiency of TWC 204 and may send a signal to the controller. Exhaust gases may then progress towards the GPF 206 where the exhaust is filtered to remove particulate matter pollutants. Over time, particulate matter may build up on the walls of the filter that may increase the backpressure, impacting negatively on fuel economy. Therefore, this buildup of particulate matter is burned off (e.g. regenerated) at regular intervals. Due to the temperature of the exhaust gas and close-coupled position of the GPF relative to the engine, regeneration of the GPF may occur relatively regularly and without having to perform a specific regeneration routine. However, in certain conditions or due to certain drive cycles (e.g., in-city driving), particulate matter may accumulate on the GPF and thus there may be a need to regenerate the GPF. For example, filter regeneration may be initiated at a fixed interval of miles of vehicle travel or when exhaust backpressure reaches a threshold value, which may be determined based on output of the differential pressure sensor reaching a selected output. Herein, the differential pressure sensor monitors the load of particulate matter on the GPF and the controller may initiate regeneration responsive to the load reaching a threshold level. To regenerate the GPF, the engine may be operated with rich air-fuel ratio, reductant may be injected into the exhaust, and/or other adjustments may be made to burn off the accumulated particulate matter.

Turning now to FIG. 3, depicted is another example embodiment of an exhaust system 300 coupled to the engine (e.g., engine 10 at FIG. 1). Exhaust system 300 includes a muffler 320 positioned downstream of the exhaust aftertreatment device 70. Muffler 320 may reduce the amplitude of sound pressure created by the exhaust gases prior to their exit into the atmosphere. The exhaust gases may pass through one or more chambers or other sound-reducing structures within the muffler 320 before exiting the muffler via a muffler outlet to the exhaust passage 48 and/or a tailpipe of the exhaust system en route to atmosphere.

Exhaust system 300 includes an exhaust tuning valve 318 that is controlled to regulate the portion of exhaust gas that flows through muffler 320. The exhaust tuning valve 318 is mounted in the exhaust system 300, downstream of the exhaust device 70 and downstream of the DP sensor 208, wherein exhaust tuning valve 318 is coupled in a parallel passage 324 to the muffler 320. Exhaust gases exiting via the exhaust system of the engine may pass through exhaust tuning valve 318 in certain conditions depending on whether the valve is in an open or a closed position. In one embodiment, when the exhaust tuning valve 318 is in the closed position, the exhaust gases may only exit (e.g., to atmosphere) by passing through the exhaust passage 48 and muffler 320 of the exhaust system 300. When the exhaust tuning valve 318 is in the open position, at least a portion of the exhaust gas may pass through passage 324 shown in FIG. 3, bypassing the muffler 320. In one example, the open vs. closed position of the exhaust tuning valve 318 may be varied by the controller. The controller (e.g., controller 12 at FIG. 1) may receive signals and communications from various sensors coupled to engine 10, such as from sensors coupled to the exhaust device 70, and in accordance may actuate exhaust tuning valve position to regulate the amounts of exhaust gases passing through the muffler. In other examples, the exhaust tuning valve 318 may be a passively-controlled valve that is maintained closed until exhaust pressure exceeds a threshold, at which point the exhaust tuning valve may open. In some examples, the exhaust tuning valve may be operated partially open or partially closed, allowing exhaust gases to be routed in part through the muffler and in part through the exhaust tuning valve and into the passage 324, before exiting into the atmosphere.

While FIGS. 2 and 3 are depicted as separate exhaust systems, it may be understood that in some examples the EGHR system of FIG. 2 and the muffler and exhaust tuning valve of FIG. 3 may be included in the same exhaust system. For example, the muffler and exhaust tuning valve of FIG. 3 may be included downstream of the EHGR system of FIG. 2.

The gasoline particulate filter 206 may be diagnosed for degradation with the use of the differential pressure sensor 208 shown in FIG. 2 and FIG. 3, where the DP sensor 208 outputs the difference in exhaust pressure upstream and downstream of the GPF 206. As shown in FIG. 2 and FIG. 3, differential pressure sensor 208 is connected to an upstream side of GPF 206 via the upstream hose 210 and a downstream side of GPF 206 via the downstream hose 212. Thus, the differential pressure sensor 208 sees both upstream pressure and downstream pressure across the GPF 206, however the output of the DP sensor 208 is differential pressure (e.g. delta pressure). Thus, in the event that the upstream hose of the DP sensor becomes disconnected/decoupled from the exhaust passage, the output of the DP sensor may drop to below a certain threshold indicating a hose disconnect and thus the controller may identify a defect in the exhaust system. However, in the event of the downstream hose of the DP sensor becoming disconnected from an exhaust passage, the controller may be unable to detect the downstream hose disconnect since the upstream-side of the differential pressure sensor is measuring exhaust pressure upstream of the GPF while the downstream side measures atmospheric pressure, and thus the output of the differential pressure sensor may mimic the pressure drop across the GPF. A particulate filter downstream hose diagnostic discussed in further detail below may enable a determination as to whether the downstream hose is disconnected.

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

As discussed above, reduced engine operating times in hybrid electric vehicles (such as the vehicle system 100 described in detail at FIG. 1 above) may limit opportunities to conduct onboard diagnostic procedures. It is herein recognized that a number of diagnostics relevant to the present disclosure may be conducted during engine-shutdown events, where rather than completely shutting down the engine, the electric motor (e.g., electric machine 195 at FIG. 1) may be commanded to rotate the engine unfueled, to provide sufficient air flow for conducting a particular set of onboard diagnostic routines. However, while such methodology may reduce situations where engine combustion is commanded to conduct diagnostics (thereby improving customer satisfaction), the reliance on the electric motor may somewhat degrade fuel economy as compared to engine pull-down events where the engine is simply commanded to be shut down and where a generator charges the battery. Thus, it is herein recognized that it may be desirable to have an adjustable prioritization scheme for enabling desired diagnostics to be conducted during engine-pulldown events where the engine is stopped from combusting but instead is rotated via the electric motor unfueled, as will be elaborated in greater detail below. Discussed herein, engine pulldown events where the engine is stopped from combusting but is rotated unfueled are referred to as inhibit pulldown (IPD) requests or events.

Accordingly, turning now to FIG. 4, an example timeline 400 depicts an IPD event which may be relied upon for conducting particular diagnostics of the present disclosure. The diagnostics relevant to the present disclosure which may be conducted responsive to an IPD event will be elaborated in further detail below. Timeline 400 includes plot 402, indicating engine speed (revolutions per minute, or RPM), over time. Timeline 400 further includes plot 404, indicating whether fueling is provided to the engine (yes or no), over time. Timeline 400 further includes plot 406, indicating whether the electric motor (e.g., electric machine 195 at FIG. 1) is on or off, over time.

At time t0, the engine is operating in a combusting mode of operation, as the engine is being fueled (plot 404), and the combusting of the engine is driving rotation of the engine at the requested speed (plot 402). At time t0, the electric motor is not in operation (plot 406), thus it may be understood that engine combustion is solely being used to propel the vehicle.

At time t1, conditions are indicated to be met for conducting an engine shutdown. As one example, conditions being met for an engine shutdown may include a deceleration fuel shut off (DFSO) event, where fueling to the engine is cut in response to deceleration or braking requests. Accordingly, with conditions being indicated to be met for conducting the engine shutdown at time t1, fueling of engine cylinders is discontinued (plot 404). With fueling stopped at time t1, engine speed begins to decrease between time t1 and t2. However, the controller (e.g., controller 12 at FIG. 1) requests one or more diagnostics to be run during the DFSO event, and thus the controller requests an IPD event where the engine pulldown is inhibited in order to run the one or more diagnostic routines. As discussed above, the IPD request pertains to rotating the engine unfueled via electric motor operation. It may be understood that in some examples, clutches (e.g., clutches 194 at FIG. 1) may be appropriately controlled so as to enable engine rotation independent of vehicle speed (in other words, engine rotation may not contribute to vehicle speed in some examples where the engine is rotated unfueled).

Accordingly, at time t2, the electric motor (e.g., electric machine 195 at FIG. 1) is commanded on. The electric motor may be commanded to control engine speed to a predetermined engine speed (e.g., 900 RPM, or somewhere between 600 RPM and 2000 RPM). With the electric motor commanded to control engine speed at time t2, a stabilization delay occurs between time t2 and t3. By time t3, engine speed is controlled to the requested or predetermined engine speed for the IPD event.

While engine speed is controlled to the requested or predetermined engine speed, a number of diagnostics may be conducted, discussed in greater detail below. The engine speed may be controlled to the predetermined engine speed for a predetermined duration of time, in some examples. In some examples, the predetermined duration of time may be adjustable as a function of requested diagnostics to be conducted. For example, a lower number of diagnostics may enable a reduced predetermined duration, whereas an increased number of diagnostics may enable a greater predetermined duration. At time t4, the predetermined duration of time elapses, and accordingly the use of the electric motor is discontinued (plot 406) via the controller commanding off the electric motor. With the electric motor commanded off, engine speed spins to a stop after time t4.

Thus, the timeline of FIG. 4 broadly refers to an IPD event where a number of diagnostics may be conducted. The diagnostics relevant to the present disclosure are now briefly discussed, and will be further elaborated as appropriate.

Examples of the diagnostics that may be conducted will be elaborated in greater detail below. Thus, discussed herein, a system for a hybrid electric vehicle may comprise an engine with an intake and an exhaust, the engine capable of being rotated unfueled via an electric motor. The system may further include a controller with computer readable instructions stored on non-transitory memory that when executed, cause the controller to, in response to a vehicle deceleration request, discontinue fueling the engine, conduct an initial diagnostic monitor that relies on a rich-to-lean transition, then conduct a plurality of intermediate diagnostic monitors that rely on an air flow from the intake to the exhaust established via unfueled engine rotation via the electric motor. The controller may store further instructions to discontinue rotating the engine unfueled subsequent to the plurality of intermediate diagnostic monitors being conducted, and in response to an acceleration request subsequent to discontinuing rotating the engine unfueled, conduct a final diagnostic that relies on a lean-to-rich transition.

For such a system, the system may further comprise a catalyst monitor sensor positioned in the exhaust. In such an example, the controller may store further instructions to conduct the initial diagnostic by inferring a slew rate that is based on when a voltage of the catalyst monitor sensor drops below a rich threshold and then a lean threshold, and determine if the catalyst monitor sensor is functioning as desired or expected based on the slew rate.

For such a system, the system may further comprise a gasoline particulate filter and a particulate filter pressure sensor configured to measure a differential pressure across the gasoline particulate filter, the particulate filter pressure sensor coupled at a first position upstream of the gasoline particulate filter via an upstream hose and coupled at a second position downstream of the gasoline particulate filter via a downstream hose. The system may further comprise an exhaust gas recirculation passage that includes an exhaust gas recirculation valve for routing exhaust gas from the exhaust to the intake of the engine. The system may further comprise a universal exhaust gas oxygen sensor positioned in the exhaust upstream of the gasoline particulate filter. In such an example, the plurality of intermediate diagnostic monitors may include a gasoline particulate filter downstream hose diagnostic for inferring whether the downstream hose is disconnected, an exhaust gas recirculation diagnostic for inferring whether the exhaust gas recirculation valve is degraded, and a universal exhaust gas oxygen sensor diagnostic for inferring whether the universal exhaust gas oxygen sensor is degraded. Each of the plurality of intermediate diagnostic monitors may be assigned a priority that determines an order in which the plurality of intermediate diagnostic monitors may be conducted. In such an example, the controller may store further instructions to adjust the priority for a subsequent vehicle deceleration request occurring in a same drive cycle as the vehicle deceleration request.

For such a system, the system may further comprise a catalyst positioned in the exhaust. In such an example, the controller may store further instructions to conduct the final diagnostic by inferring an amount of fuel that it takes to drive the catalyst to a rich condition when starting from an oxygen-saturated, lean condition.

Discussed herein, a method may comprise in response to fueling of an engine of a vehicle being discontinued due to a first vehicle deceleration request, maintaining the engine rotating to provide an air flow from an intake of the engine to an exhaust of the engine, and conducting a plurality of diagnostic monitors that rely on the air flow while the engine is rotating prior to reactivation of fueling of the engine.

For such a method, maintaining the engine rotating may include commanding an electric motor to rotate the engine unfueled for a predetermined duration, and then discontinuing rotating the engine unfueled so the engine spins to rest responsive to the predetermined duration elapsing. As one example, the predetermined duration may be selected as a function of the plurality of diagnostic monitors to be conducted. As another example, maintaining the engine rotating may include rotating the engine at a predetermined speed. The predetermined speed may be a speed between 600 and 2000 RPM, for example.

For such a method, the method may further comprise conducting the plurality of diagnostic monitors according to a prioritization schedule where each of the plurality of diagnostic monitors is assigned a priority that dictates an order in which each of the plurality of diagnostic monitors is conducted. In such an example, the method may further comprise adjusting the prioritization schedule for conducting the plurality of diagnostic monitors responsive to a subsequent vehicle deceleration request during a same drive cycle as the first vehicle deceleration request. Adjusting the prioritization schedule may be based on a determination of degradation inferred by one or more of the plurality of diagnostic monitors. As another example, adjusting the prioritization schedule may be based on one or more of the plurality of diagnostic monitors being interrupted by a vehicle acceleration request. In some examples, adjusting the prioritization schedule may be based on a number of times during a drive cycle that each of the plurality of diagnostics is requested to be conducted.

Discussed herein, another method may comprise in response to fueling of an engine of a vehicle being discontinued, inhibiting the engine spinning to rest by commanding the engine to rotate unfueled at a predetermined speed for a predetermined duration, manipulating a pressure in an exhaust system of the engine while the engine is rotating unfueled, and inferring whether a downstream hose that couples a differential pressure sensor to a position downstream of a gasoline particulate filter is disconnected based on an actual pressure differential across the gasoline particulate filter monitored via the differential pressure sensor while the pressure in the exhaust system is manipulated.

For such a method, manipulating the pressure in the exhaust system may include alternating between a closed position and an open position of a valve included in the exhaust.

For such a method, the valve may be an exhaust gas heat retention valve that is used to selectively bypass or route exhaust gas through a heat exchanger included in a heat recovery conduit included in the exhaust system.

For such a method, the valve may be an exhaust gas tuning valve that is used to selectively bypass or route exhaust gas through a muffler included in the exhaust system.

For such a method, the method may further comprise inferring the downstream hose is disconnected in response to the actual pressure differential exceeding a predetermined threshold pressure differential responsive to the pressure being manipulated, and in response to an indication that the downstream hose is connected or disconnected, stopping manipulating the pressure and proceeding to conduct one or more additional diagnostics that additionally rely on an air flow produced by the engine rotating unfueled for the predetermined duration.

Turning back to the figures, a first example of a diagnostic that may be conducted at an IPD event such as that depicted at FIG. 1 may include a CMS diagnostic (referred to herein as DCMS) (e.g., CMS 214 at FIG. 2). For example, when the CMS degrades, its response to air/fuel fluctuations may slow down, and at some level of degradation a slow CMS may cause a catalyst monitor (referred to herein as CATMN), which will be discussed in further detail below, to incorrectly pass a degraded catalyst (e.g., TWC 204 at FIG. 2). Thus, a purpose of the DCMS may be to ensure that the CATMN diagnostic has a valid CMS with which to perform the CATMN diagnostic. Thus, the DCMS monitor may be set to trigger a degraded CMS at a level of degradation that may cause the catalyst monitor to falsely pass a malfunctioning catalyst.

Briefly, the DCMS may include measuring a CMS rich to lean slew rate during a DFSO event. Turning to FIG. 5A, example illustration 500 depicts how such a slew rate may be determined. Plot 505 depicts voltage changes corresponding to CMS operation responsive to a DFSO event where fueling to the engine is cut. Line 512 represents a rich threshold, and line 514 represents a lean threshold. Black triangles associated with plot 505 represent individual CMS voltage determinations that occur as the fuel is cut and the CMS registers a switch from rich to lean. Plot 510 represents the CMS rich to lean slew rate, determined based on when the CMS voltage crosses the rich threshold and when the CMS voltage crosses the lean threshold (refer to filled circles at FIG. 5A). It may be understood that the slew rate may change as a function of a level of degradation of the CMS. For example, the flatter the slope corresponding to the slew rate, the more degraded the CMS. The controller may store instructions to infer a point at which the CMS is degraded based on the slew rate.

Turning to FIG. 5B, example timeline 550 is depicted, to illustrate in more detail how the DCMS may be conducted. Timeline 550 includes plot 560, indicating engine load, plot 565, depicting whether fueling is provided to the engine (yes or no), and plot 570, illustrating CMS voltage, over time. At time t0, engine load is a function of driver demand, and the engine is combusting fuel. The CMS sensor is registering rich (line 572 represents the rich threshold and line 574 represents the lean threshold).

At time t1, a DFSO event is initiated, where fueling to the engine is cut. Between time t2 and t3, the CMS registers a change in voltage such that the rich threshold is crossed and then the lean threshold is subsequently crossed. The crossing of the rich threshold and the lean threshold may be used to determine the slew rate as discussed above at FIG. 5A. At time t4 the vehicle operator requests an increased engine load, and accordingly fueling is once again provided to the engine, and after time t4 the CMS voltage changes as a function of driver demand. Thus, a transition from rich to lean at the initiation of the DFSO event may be relied upon for inferring a presence or an absence of degradation associated with the CMS.

Another relevant diagnostic to the present disclosure includes a UEGO air rationality test or monitor corresponding to the UEGO sensor (e.g., sensor 126 at FIG. 1). The UEGO monitor may be conducted when pure air entry conditions are met, for example, fuel injectors off, purging off, no fuel leaking around a PCV valve (not shown), etc. In other words, the UEGO monitor may be conducted when there is nothing for the UEGO sensor to sense, but air.

It may be understood that the UEGO sensor may be a wide-band oxygen sensor containing a pump cell (not shown) operated via the controller (e.g., controller 12 at FIG. 1). The controller may use the current required to operate the pump to determine air fuel ratio, as is known in the art. Briefly, the UEGO sensor may include a reference air cell (not shown), a Nernst cell (not shown), and a measurement cell (not shown). The sensor may compare exhaust gas oxygen content with the content of the reference cell. The oxygen for the reference chamber may be supplied by pumping oxygen ions from the measurement chamber into the reference chamber. The Nernst cell may compare the oxygen content of the exhaust to that of the reference chamber. As exhaust gas becomes rich or lean, oxygen is pumped in and out of the measurement chamber to maintain a mixture of 1.0 Lambda. The amount of oxygen needed to do this may vary depending on the air fuel ratio. The controller may measure the current of the pump needed to maintain the correct mixture, and may estimate air fuel ratio from the pump current.

The UEGO test of the present disclosure specifically relates to UEGO sensors with a trim resistor installed in a UEGO connector (not shown) to compensate each sensor for manufacturing variation. For example, the trim resistor may be connected in parallel to a pumping current sense resistor (not shown), and pumping current may flow through both. The trim resistor may adjust the measured pumping current back to an expected nominal value at any given air fuel ratio (correcting for sensor to sensor variations in the diffusion passage). Under conditions where the trim resistor is degraded, all of the pumping current may flow through the pumping current sense resistor, thereby increasing the measured voltage. Since the pumping current is amplified, a UEGO transfer function may reflect the error, which may result in an incorrect output of the UEGO signal.

Turning to FIG. 6, an example timeline 600 is shown, depicting how such a UEGO air rationality test may be conducted, based on the explanation provided above. Timeline 600 includes plot 605, illustrating pumping current for a non-degraded UEGO sensor, and plot 610 depicts pumping current for a degraded UEGO sensor, over time. Line 612 represents a maximum threshold pumping current in air. Timeline 600 further includes plot 615, indicating whether fueling is provided to the engine (yes or no), over time. Timeline 600 further includes plot 620, indicating whether the electric motor is in operation (on), or not (off), over time. When the electric motor is on in this example timeline, it may be understood that the electric motor is being used to rotate the engine unfueled to carry out the UEGO diagnostic monitor.

At time t0, the engine is on and is combusting air and fuel. At time t1, conditions are met for entering into DFSO, and accordingly, fueling to the engine cylinders is discontinued (plot 615). Shortly thereafter, at time t2, the electric motor is commanded on (plot 620) in order to rotate the engine unfueled to generate air flow for conducting the UEGO monitor. In a case where the UEGO sensor is non-degraded, the pumping current is maintained below the maximum threshold pumping current in air, as illustrated by plot 605. Alternatively, in a case where the UEGO sensor is degraded, the pumping current exceeds the maximum threshold pumping current in air, as illustrated by plot 610. At time t3, electric motor operation ceases and at time t4, conditions are met for once again fueling the engine.

While pumping current is depicted at FIG. 6 for determining whether the UEGO sensor is functioning as desired or expected, in other examples (not shown), UEGO sensor voltage readings may additionally or alternatively be used in similar fashion as that discussed for pumping current for inferring whether the UEGO sensor is functioning as desired or expected.

Another diagnostic relevant to the present disclosure may include an EGR diagnostic. Specifically, during an IPD event, vehicle systems such as vehicle system 100 at FIG. 1 may monitor "excess EGR flow" under "no expected EGR flow" conditions. Briefly, the diagnostic may include commanding or maintaining fully closed the EGR valve (e.g., EGR valve 182 at FIG. 1), and monitoring pressure across the EGR reference orifice (e.g., reference orifice 183 at FIG. 1) via the DPFE sensor (e.g., DPFE sensor 184 at FIG. 1). In a case where the DPFE sensor registers a pressure difference greater than a predetermined threshold pressure difference, EGR degradation may be indicated. For example, there may be degradation of the EGR valve itself, or there may be a source of degradation in the EGR passage between the reference orifice and the EGR valve.

As a more detailed and specific example, turning to FIGS. 7A-7B, a high-level example method 700 is shown, depicting how excess EGR flow may be monitored as discussed herein.

At 702, the routine includes determining if an engine shut-down has been requested. The hybrid vehicle may be operated via engine torque and/or motor torque. The hybrid vehicle may be operated via motor torque during lower than threshold operator torque demand conditions. The threshold torque demand may be calibrated based on a maximum amount of power deliverable by the electric motor (such as electric machine 195 in FIG. 1). Also, vehicle operation via motor torque may be based on a state of charge (SOC) of a battery (such as traction battery 196 in FIG. 1) supplying power to the electric motor. The vehicle may be transitioned from being operated via engine torque to being operated via motor torque upon confirmation that the battery SOC is higher than a threshold SOC, the threshold SOC corresponding to the operator torque demand. An engine shut-down request may be made in response to a lower than threshold operator torque demand and a higher than threshold battery SOC. As an example, an engine shut-down request may correspond to a DFSO event.

If it is determined that engine shut-down has not been requested, at 704, current engine operation may be maintained. Fuel may be delivered to one or more engine cylinders via one or more fuel injectors and spark may be enabled for each engine cylinder. The EGR valve (e.g., EGR valve 182 at FIG. 1) may be at least partly open to recirculate a portion of exhaust gas to the intake manifold. The degree of opening of the EGR valve may be estimated based on engine operating conditions such as engine speed, engine temperature, and engine load.

If it is determined that engine shut-down has been requested, at 706, the routine includes determining if entry conditions for EGR valve diagnostics are met. If it is determined that conditions are not met for EGR valve diagnostics, at 708, the engine may be shut-down without initiating EGR valve diagnostics. However, in other examples other diagnostics relevant to the present disclosure may be conducted in lieu of the EGR valve diagnostic. In an example where other diagnostics are not requested, in order to shut down the engine, the controller may suspend fuel injection and spark to each of the engine cylinders. Upon engine shut-down, the electric motor may be operated to propel the vehicle in some examples.

If it is determined that conditions are met for EGR valve diagnostics, then EGR valve diagnostics may be initiated. At 710, engine combustion may be suspended. The controller may suspend fuel injection and spark to each of the engine cylinders. Upon suspension of combustion, the engine speed may start steadily decreasing.

At 714, the routine includes determining if the engine speed has reduced to a threshold speed. The threshold speed may correspond to an engine speed at which the engine may be stabilized prior to initiation of the EGR valve diagnostic routine. In one example, the threshold speed may be 900 rpm. By stabilizing the engine speed at the threshold speed, a steady supply of intake air flow may be ensured prior to the EGR valve diagnostics. If it is determined that the engine speed has not reached the threshold speed, at 716, the controller may wait for the engine speed to stabilize at the threshold speed prior to initiating EGR valve diagnostics.

If it is determined that the engine speed has reached the threshold speed, at 718, the engine may be rotated at the threshold speed via the electric motor. The period (referred herein as virtual idle) during which the electric motor spins the engine at the threshold speed, may provide a window to collect data for EGR valve diagnostics. At 720, the controller may send a signal to an actuator coupled to the EGR valve to actuate the EGR valve to a completely closed position. Upon completely closing the valve, gas (air) may no longer flow via the EGR passage provided the EGR valve is functioning as desired or expected.

In one example, an EGR valve diagnostic routine may have been started during a previous virtual engine idling condition, however, the data collected during the previous diagnostics window may not have been sufficient to complete the EGR valve diagnostics. If an incomplete dataset for EGR diagnostics is available, at 722, the dataset may be optionally retrieved from the controller memory.

At 724, the controller may estimate an actual EGR mass flow based on inputs from one or more EGR sensors such as an EGR delta pressure sensor (e.g., delta pressure sensor 184 in FIG. 1) and an EGR absolute pressure sensor (not shown) coupled to the EGR system. Since the engine is non-combusting, the EGR mass flow (if any) may constitute air flowing through the exhaust passage. Due to degradation, such as due to EGR valve leakage or when the EGR valve is stuck in an open position, EGR may flow through the EGR passage even when EGR supply is not commanded due to degradation, Also, the controller may determine the intake air mass flow based on inputs from an intake air flow sensor (such as sensor 120 of FIG. 1).

At 726, a fixed tolerance threshold may be determined for undesired EGR flow based on emissions control regulations. The fixed tolerance threshold may be a constant value and EGR flow above the fixed tolerance threshold for a predetermined duration of time may result in undesired levels of emissions.

At 728, mass flow error between the fixed tolerance threshold and the measured EGR mass flow may be determined during the diagnostic window (engine rotated at the threshold speed). At 730, an accumulated EGR mass flow error over the diagnostic window, as given by equation 1, may be determined as:

$$E_{mf4} = \Sigma(M_{mdh}\dot{} - T_4) \quad (1)$$

where $E_{mf4}$ is the accumulated EGR mass flow error over the diagnostic window, $T_4$ is the fixed tolerance band, and $M_{mdh}\dot{}$ is the measured EGR mass flow during the engine virtual idling. In one example, if an incomplete dataset is retrieved at step 722, the accumulated EGR mass flow error may be computed as given by equation 2:

$$E_{mf4} = \Sigma(M_{mdh}\dot{} - T_4) + E_{mf4\_1} \quad (2)$$

where $E_{mf4\_1}$ is the accumulated EGR mass flow error retrieved from the previous diagnostic window.

At 730, an intake air mass flow over the diagnostic window, as given by equation 3, may be determined as:

$$E_{af4} = \Sigma M_{af}\dot{} \quad (3)$$

where $E_{af4}$ is the accumulated commanded intake air mass flow over the diagnostic window, and $M_{af}\dot{}$ is the intake air mass flow. In one example, if an incomplete dataset is retrieved at step 722, the accumulated intake air mass flow error may be computed as given by equation 4:

$$E_{af4} = \Sigma M_{af}\dot{} + E_{af4\_1} \quad (4)$$

where $E_{af4\_1}$ is the accumulated intake air mass flow retrieved from the previous diagnostic window.

At 734, a ratio (error ratio) of the accumulated EGR mass flow error to the accumulated intake air mass flow may be estimated as shown in equation 5 as:

$$E_{ratio4} = \frac{E_{mf4}}{E_{af4}} \quad (5)$$

where $E_{ratio4}$ is the error ratio of accumulated EGR mass flow to the accumulated intake air mass flow.

The method continues to step A as elaborated in FIG. 7B.

At 736 (illustrated in FIG. 7B), method 700 includes determining if the engine has been idling for a duration (engine idling duration) that is longer than a threshold duration. The threshold duration, or predetermined duration, may correspond to a time required for the accumulated intake air mass flow to reach a first threshold accumulation limit at which a steady air mass may flow through the engine. As mentioned above and which will be elaborated in greater detail below, in case where other diagnostics are conducted in addition to the EGR valve diagnostic, the predetermined duration may be increased, as compared to when just the EGR valve diagnostic is requested. In one example, the controller may calibrate the first threshold accumulation limit based on fuel economy and emissions quality. In another example, during calibration of the threshold duration, the controller may account for the amount of battery charge used for spinning the engine, and the controller may continue spinning the engine until a predetermined amount of battery charge may be used up. Further, the controller may take into account driver perception caused by the delay in engine pull-down and the prolonged engine idling. The virtual engine idling period may not be longer than a threshold duration after which the driver may perceive an undesirable delay in engine shut-down.

If it is determined that the engine idling duration is shorter than the threshold duration, at 738, the engine may be continued to be rotated at the threshold speed, via the electric motor. If it is determined that the engine idling duration has reached or exceeded the threshold duration, at 739, engine rotation may be suspended. The controller may send a signal to the electric motor to stop spinning the engine. The electric motor may be continued to be operated to propel the vehicle.

At 740, the routine includes determining if accumulation of a dataset has been completed. A completed dataset may include sufficient data points to complete the EGR valve diagnostics. In one example, sufficient data points (including accumulated EGR mass flow error and accumulated intake air mass flow) may include the accumulated intake air mass flow reaching a second threshold accumulation limit, the second threshold accumulation limit being higher than the first threshold accumulation limit. If the dataset accumulated during the engine virtual idling condition (diagnostic window), includes a lower than second threshold accumulation for the accumulated intake air mass flow, it may be inferred that further data points (including accumulated EGR mass flow error and accumulated intake air mass flow) may be collected prior to carrying out a robust EGR system diagnostics. If it is determined that the dataset is incomplete, the dataset may be saved in the controller memory, and at 742, EGR valve diagnostics may be continued during the immediately subsequent (next) virtual engine idling condition.

If it is determined that the dataset is completed, EGR diagnostics may be continued. The ratio (error ratio) of the accumulated EGR mass flow error to the accumulated intake air mass flow (as estimated in step 734) may be compared to a threshold, threshold_1. At 744, the routine includes determining if the error ratio is higher than the threshold. The threshold may be calibrated based on a level of undesired EGR flow above which emissions quality may be adversely affected during an upcoming engine drive cycle.

If it is confirmed that the error ratio is lower than the threshold, it may be inferred that the system is not degraded and the emissions levels may not be affected by any undesired EGR flow. At 748, the controller may indicate that the EGR system is not degraded and the current EGR valve position may be maintained in the closed position. However, if it is determined that the error ratio is higher than the threshold, at 746, degradation of the EGR system may be indicated by setting a diagnostic code (e.g., flag). In one example, the degradation of the EGR system may include the EGR valve stuck in an at least partially open position causing EGR to flow through the EGR valve even when it is commanded to a closed position.

At 747, in response to detection of degradation of the EGR valve, EGR flow may be adjusted during subsequent engine cycles. In one example, an opening of the EGR valve may be adjusted accounting for degradation of the EGR valve causing an EGR flow even when the valve is commanded to be closed. In another example, in response to detection of degradation of the EGR valve, during subsequent engine operation, engine air fuel ratio may be adjusted taking into account the undesired EGR flow. As an example, the controller may send a signal to the fuel injectors to adjust fueling to one or more engine cylinders to compensate for the EGR supplied to the engine cylinders. In yet another example, since continuous presence of EGR may cause degradation of combustion quality, spark timing may be adjusted to compensate for the degraded EGR system.

In one example, dataset accumulation may be completed prior to the engine idling duration reaching the threshold duration such as during a scenario when a portion of the total dataset may include data retrieved from a previous engine idling condition (such as retrieved in step 722). Therefore, even if at 736 it is determined that engine idling duration is lower than the threshold duration, the routine may proceed to step 740 for determination if the dataset is complete. If the dataset is complete prior to the engine idling duration reaching the threshold duration, EGR system diagnostics may be carried out with the completed dataset while further EGR mass flow and intake air mass flow may be continued (referred to herein as learn-ahead data) to be estimated for the remaining engine idling period. This data accumulated after completion of the EGR diagnostics may be used as a starting point during data accumulation during an immediately subsequent virtual engine idling condition. In one example, EGR system diagnostics may be carried out for two consecutive datasets and EGR diagnostics may be completed taking into account the two datasets. In another example, EGR system diagnostics may be carried out for three or even four consecutive datasets, and EGR diagnostics may be completed taking into account the three, or even four datasets. In this way, multiple datasets may be recorded and error margin in EGR system diagnostics may be reduced.

FIG. 8 shows an example operating sequence 800 illustrating a diagnostic routine of an exhaust gas recirculation system (such as EGR system 180 at FIG. 1) coupled to a hybrid vehicle system, such as the vehicle system of FIG. 1. It may be understood that in some examples the EGR system may be a high pressure EGR system, while in other examples the EGR system may be a low pressure EGR system, without departing from the scope of this disclosure. Degradation of the EGR system such as a stuck open EGR valve may be indicated following the diagnostic routine. The horizontal (x-axis) denotes time and the vertical markers t1-t5 identify significant times in the operation of the vehicle system.

The first plot 802 shows variation in engine speed over time, as estimated via inputs from a crankshaft sensor. A first dashed line 801 shows a first threshold engine speed for stabilizing intake air flow during engine spin-down. The second plot 804 shows operation of an electric motor (such as electric machine 195 at FIG. 1) capable of propelling the vehicle and/or rotating the engine (e.g., unfueled engine rotation). The third plot 806, shows a degree of opening of an EGR valve (e.g., EGR valve 182 at FIG. 1) coupled to the EGR passage (e.g., EGR passage 181 at FIG. 1). The fourth plot 808, shows a measured EGR flow rate as estimated based on inputs from EGR system pressure sensors. Dashed line 809 shows an EGR tolerance limit. The EGR tolerance limit may be calibrated based on NOx emission limits. Undesired EGR flow above the EGR tolerance limit for a duration may cause undesirable NOx emissions. The fifth plot 810 shows intake air flow as estimated via an intake manifold air flow sensor. The sixth plot 812 shows an error ratio of an accumulated EGR mass flow error and an accumulated commanded intake air mass flow. The accumulated EGR mass flow error includes a difference between an EGR tolerance limit and the measured EGR flow rate accumulated (summed) over a time period of the diagnostic test. The accumulated intake air mass flow is estimated by accumulating (summation) intake air mass flow over the time period of the test. Dashed line 814 denotes an error ratio threshold above which the EGR system may be determined to be degraded. The threshold 814 may be based on a measured exhaust emissions level including one of an exhaust NOx level and an exhaust particulate matter level. The seventh plot 816 shows a position of a flag indicating degradation of the EGR system such as the EGR valve being stuck at a partially open position.

Prior to time t1, the engine is rotated by combustion of air and fuel in the engine cylinders. The electric motor is not operated for vehicle propulsion. The EGR valve is in an open position to recirculate a portion of exhaust to the intake manifold. Since EGR system diagnostics is not completed, the flag is maintained in an OFF position.

At time t1, in response to an engine shut-down request, the electric motor is activated to control engine speed to the threshold speed (line 801). The controller stabilizes the engine at the first threshold speed and delays engine shut-down.

Between time t2 and t3, power from the electric motor is used to rotate the engine at the threshold speed 801. The time period between time t2 and t3 comprises a window for carrying out EGR system diagnostics. An EGR mass flow error is estimated as a difference between the instantaneous EGR flow and the EGR tolerance limit 809. The EGR mass flow error is accumulated over the duration of the window. An intake air mass flow is also accumulated over the duration of the window. An error ratio is computed between the accumulated EGR mass flow error and the accumulated intake air mass flow. The error ratio is accumulated taking into account a previously incomplete data set (collected during an immediately previous diagnostics window). However, at the end of the diagnostics window it is observed that the error ratio (plot 812) is below the threshold 814, thereby indicating that the EGR system is not degraded.

The engine is continued to be rotated at the idling speed via the electric motor and a new dataset is recorded for the error ratio. At time t4, upon completion of a threshold duration since the initiation of engine rotation via machine power, engine rotation is discontinued. Between time t4 and t5, the engine spins down to rest. After time t5, the engine is no longer spinning and the vehicle is operated via machine torque. As the engine is no longer rotated, intake air flow and EGR flow also decreases to zero.

However, as shown by dotted line 813, if the error ratio had reached the threshold 814 within time t2, it would have been indicated that the EGR system is degraded and the flag 816 would be set. In response to the indication of EGR system degradation, during subsequent engine cycles, the EGR valve may be adjusted while accounting for the excess EGR flow caused by the degradation.

Yet another diagnostic relevant to the present disclosure may include a particulate filter downstream hose diagnostic as mentioned above. Such a diagnostic may be conducted during an IPD event, specifically during the time of the IPD event where engine speed is controlled to the desired engine speed via operation of the electric motor (e.g., between time t3 and t4 at FIG. 4). In order to elaborate on how the particulate filter downstream hose diagnostic is conducted, we turn to method 900 at FIG. 9. Instructions for carrying out method 900 and the rest of the methods included herein may be executed by the controller (e.g., controller 12 at FIG. 1) based on instructions stored on a memory of the controller and in conjunction with signals received from sensors of the engine system, such as the sensors described above with reference to FIGS. 1-3. The controller may employ actuators of the engine (e.g., engine 10 at FIG. 1) to alter states of devices in the physical world, according to the methods described below.

Method 900 begins at 905, and determines whether entry conditions are met for conducting the particulate filter downstream hose diagnostic. The entry conditions for the diagnostic test may be a pre-defined set of engine operating conditions that may all have to be satisfied in order for the method 900 to proceed further and may comprise air mass being within a desired test range, steady state conditions as defined by a change in mass air flow being less than a threshold, no existing EGHR valve faults (and/or exhaust tuning valve faults), no exhaust pressure sensor faults, exhaust being warm enough to test (as inferred by the catalyst temperature measured by a temperature sensor such as sensor 216), engine coolant temperature being above a threshold, and the vehicle being in the process of an IPD event where engine speed is controlled to a predetermined engine speed via the controller rotating the engine unfueled via the electric motor (e.g., refer to the time period between time t3 and t4 at FIG. 4). In one example, storage medium read-only memory 106 may be programmed with instructions executable by processor 102 to verify if entry conditions required for the diagnostic test have been satisfied. If all entry conditions are not met, then method 900 moves to 910 to continue maintaining current engine operating conditions. In other examples, not all entry conditions may have to be satisfied before proceeding, for example a subset of the entry conditions may be met. Maintaining current operating conditions may include continuing to adjust the EGHR valve (e.g., EGHR valve 251 at FIG. 2) based on engine coolant temperature demands. Maintaining current operating conditions may further include monitoring particulate filter load based on the output from the differential pressure sensor (e.g., sensor 208 at FIG. 2). Method 900 then returns.

However, if at 905 the subset or all of the entry conditions are satisfied, method 900 proceeds to begin the diagnostic test for checking the downstream hose connection of the DP sensor coupled across the GPF. At 910, method 900 begins the EGHR valve closed phase which includes fully closing the EGHR valve at 910. Once the EGHR valve is fully closed, the method includes computing a rolling average of the output of the differential pressure sensor. In one example, the rolling average differential pressure output may include a series of averages computed by the controller of varying subsets of the data accumulated over time. In another example, the rolling average may be a cumulative rolling average of all the stored data output of the DP sensor that may take into account each new output data of the DP sensor and may further compute the average of all data up to the current time. In yet another example, the computed average may be a non-rolling average that may involve discrete data obtained at the time of the test. As described herein, the closed position of the EGHR valve may allow all exhaust gas to flow through exhaust passage 48 (and not through the heat recovery conduit e.g., heat recovery conduit 253 at FIG. 2) to atmosphere. The closed position of the EGHR valve may also function to relieve any built-up backpressure in the exhaust system. The EGHR valve may only be held closed for a specified duration of time to allow for determination of the average pressure output and once the closed test duration expires, method 900 proceeds to open the valve at 920 to end the closed phase of the EGHR valve.

At 920, method 900 begins the EGHR valve open phase which includes fully opening the EGHR valve at 920. In some examples, the closed phase of the routine may transition directly into the open phase (e.g., the closed phase may begin as soon as the open phase ends). In other examples, the open phase may be spaced apart from the closed phase by a duration.

After the EGHR valve is fully opened, the method includes again computing a rolling average of the output of the differential pressure sensor. As described before, the open position of the EGHR valve may route at least a portion of exhaust gases through the heat recovery conduit (e.g., heat recovery conduit 253 at FIG. 2). The open position of the EGHR valve may further build up backpressure in the exhaust system due to a more restricted flow of exhaust. This backpressure may be measured by the DP sensor (e.g., sensor 208 at FIG. 2) and may be taken into account when computing differential pressure output over a rolling average with the EGHR valve in the open position. The EGHR valve may only be held open for a specified duration of time to allow for determination of the average pressure output and once the test duration expires, method 900 may proceed to close the EGHR valve to end the open phase of exhaust tuning valve.

At 925, method 900 calculates the difference between the closed rolling average and the open rolling average of the DP sensor output obtained at 915 and 920, respectively. In one example, the difference may be an absolute value, such that the differential between the two average differential pressures is assessed and the directionality of the difference may be dispensed with. At 930, method 900 determines if the calculated differential pressure (e.g. the difference between the rolling average of DP sensor output during the open versus closed phases of the EGHR valve at a given time) is found to be greater than a threshold. The threshold referred to at 930 may be indicative of an output of the DP sensor that is dependent on engine operating conditions and may further represent a pressure value above which degradation of the downstream hose connection is indicated. If the calculated differential pressure is not found to be greater than the threshold at 930, then method 900 concludes at 935 that the downstream hose is intact and is connected to the exhaust device/exhaust passage downstream of the GPF (e.g., GPF 206 at FIG. 2). Proceeding to 950, method 900 may include updating vehicle operating parameters, which may include storing the passing result at the controller, scheduling future downstream hose diagnostics as a function of the passing result, etc. Method 900 may then end.

However, if the calculated differential pressure is found to be greater than the threshold at 930, then method 900 moves to 940 and diagnoses the downstream hose of the DP sensor as being disconnected from the exhaust system. It may be understood that the downstream hose being disconnected may obscure accurate particulate filter diagnostics. Thus, at least in some examples, responsive to the indication that the downstream hose is disconnected, engine operating parameters may be updated at 950 to reduce engine-out particulate matter, thus lowering the particulate load on the particulate filter. The engine operating parameters that may be adjusted include spark timing, fuel injection amounts, engine torque limits, and/or other operating parameters. Furthermore, in a case where the downstream hose is indicated to be disconnected, a flag may be set at the controller, and/or a malfunction indicator light (MIL) may be illuminated at the vehicle dash, to alert the vehicle operator of a request to service the vehicle. Method 900 may then end.

While the above-described methodology of FIG. 9 is discussed with regard to the EGHR valve (e.g., EGHR valve 251 at FIG. 2), it may be understood that similar methodology may be conducted by alternately relying on the exhaust tuning valve (e.g., exhaust tuning valve 318 at FIG. 3), without departing from the scope of this disclosure.

Referring now to FIG. 10, an example timeline 1000 illustrating the diagnostic test methodology of FIG. 9 for an engine operating with a DP sensor (e.g., such as the sensor 208 shown in FIG. 2) and an EGHR valve (e.g. such as the EGHR valve 251 shown in FIG. 2), is depicted. The diagnostic test may detect a downstream hose disconnect by regulating the EGHR valve position from fully closed to fully open and obtaining differential pressure outputs from the DP sensor at both valve positions. The intrusive test period consists of a valve open period (t041) and a valve closed period (t1-t2) and based on a comparison of differential pressure outputs obtained during these periods, a hose disconnected state may be inferred. While a single valve open period and a single valve closed period is depicted at FIG. 10, in other examples a plurality of open periods and a plurality of closed periods may be used to infer a hose disconnected state, without departing from the scope of this disclosure.

FIG. 10 shows differential pressure output from the DP sensor during different positions of the EGHR valve, during steady-state conditions (e.g. constant exhaust flow rate) over time. The horizontal (x-axis) denotes time and the vertical markers t1-t2 identify exhaust valve open and close time durations during an IPD event (e.g., during the time between time t3 and t4 of FIG. 4). The first plot from the top shows exhaust mass flow (line 1005) over time, which stays relatively constant during the test period that includes the open and closed durations of the EGHR valve. The second plot (line 1010) from the top denotes the EGHR valve position over time (e.g. fully open during t0-t1 and fully closed during t1-t2). The third plot from the top shows the differential pressure that may be measured by the DP sensor during the test period. The dotted line 1020 depicts differential pressure measurements that may be seen when the downstream hose is intact/connected and the solid line 1015 shows differential pressure measured when the downstream hose connection is disconnected. The fourth plot from the top illustrates that the electric machine is in operation (on) (line 1025) during the test. It may be understood that the electric machine is in operation in order to rotate the engine unfueled, as discussed above. The fifth plot from the top illustrates that fuel injection (line 1030) to the engine is discontinued during the test (hence the use of the electric motor to rotate the engine unfueled).

As seen from line 1020 in the third plot, the differential pressure output from the DP sensor does not change (the difference in differential pressure when the valve is open as compared to when the valve is closed is less than the predetermined threshold difference, represented by line 1021) responsive the EGHR valve being moved from the fully open to the fully closed position, when the downstream hose connection for the DP sensor is intact. However, as shown by plot 1015, when the downstream hose is disconnected, the difference in differential pressure when the valve is open as compared to when the valve is closed is greater than the predetermined threshold difference (refer again to line 1021). This is because when the downstream hose is connected, the increased backpressure that results from closing the exhaust tuning valve is also measured by the downstream-side of the differential pressure sensor, resulting in a minimal or no change in the differential pressure. In contrast, when the downstream hose is disconnected, the increased backpressure that is measured by the upstream-side of the differential pressure sensor is relative to atmospheric pressure, which does not change when the exhaust tuning valve is closed, thus resulting in a substantial differential pressure.

Similar to that discussed above, in other examples the diagnostic depicted by the methodology of FIG. 9 and the timeline of FIG. 10 may be conducted in similar fashion via reliance on an exhaust tuning valve (e.g., exhaust tuning valve 318 at FIG. 3) instead of the EGHR valve. In a case where the exhaust system includes both an EGHR valve and an exhaust tuning valve, then the controller may select which valve to use for the diagnostic methodology, and may ensure that the other, non-selected valve does not interfere with the diagnostic. For example, the non-selected valve may be commanded to a state in which there is no additional restriction imposed on the exhaust flow, such that modulation of the selected valve may reliably result in the development of differential exhaust pressure depending on whether the selected valve is open or closed.

Yet another diagnostic relevant to the present disclosure may include the catalyst monitor (CATMN), as mentioned above (e.g., monitor for the three-way catalyst 204 at FIG. 2). Briefly, the principle for the catalyst converter monitor may be that the catalyst has oxygen storage in addition to precious metal, and as the catalytic converter conversion efficiency degrades, oxygen storage in the catalytic converter may also degrade. By monitoring the amount of oxygen stored by the catalyst, the conversion efficiency may be compared to a baseline (e.g., new catalyst), to infer a level of catalyst degradation (or simply whether the catalyst is degraded or not).

As one example, methodology to measure oxygen storage in the catalyst may be conducted via an integrated air fuel ratio (IAF) catalyst monitor. However, other methodology is within the scope of this disclosure. The IAF catalyst monitor may run immediately after a DFSO event, when the fuel injectors are re-activated to once again supply fuel to the engine, thus resulting in a lean-to-rich scenario. This may be understood to be in contrast to, for example the DCMS monitor discussed above, which relies on a rich-to-lean scenario. Briefly, the IAF catalyst monitor integrates how much excess fuel is needed to drive the monitored catalyst to a rich condition when starting from an oxygen-saturated, lean condition. Thus, the monitor may be understood to be a measure of how much fuel is needed to force catalyst breakthrough from lean to rich as monitored via the rear oxygen sensor (e.g., CMS 214 at FIG. 2). To accomplish the above, the monitor may run during fuel reactivation following a DFSO event, as mentioned.

Turning to FIG. 11, an example timeline 1100 depicts how the CATMN may be executed. Timeline 1100 includes plot 1105, indicating whether fuel injection to engine cylinders is on, or off, over time. Timeline 1100 further includes plot 1110, indicating estimated oxygen storage by the catalyst (e.g., catalyst 204 at FIG. 2), over time. Timeline 1100 further includes plot 1115, indicating CMS (e.g., CMS 214 at FIG. 2) voltage, over time. With regard to CMS voltage, it may be understood that voltage between 0-0.45 V may be indicative of a lean condition (e.g., oxygen stored has not been consumed), whereas voltage between 0.45 and 1 may be indicative of a rich condition (e.g., oxygen stored has been consumed).

At time t0, the engine is in operation with fuel being provided to engine cylinders (plot 905) for combustion. Estimated oxygen storage is low, and CMS voltage is between 0.45 and 1 V, indicative of a rich condition.

At time t1, conditions are met for entering into a DFSO event. Accordingly, fuel injection to engine cylinders is discontinued (plot 1105). With fuel injection stopped, estimated oxygen storage at the catalyst increases between time t1 and t2 (plot 1110), and CMS voltage begins to drop (plot 1115).

At time t2, estimated oxygen storage at the catalyst saturates, and remains saturated between time t2 and t3. Accordingly, between time t2 and t3, CMS voltage drops to between 0 and 0.45 V, indicative of a lean condition.

At time t3, conditions are met for reinitiating fueling to the engine. Accordingly, fuel injectors are commanded on. With the fuel injectors commanded on, estimated oxygen storage begins to drop between time t3 and t4, and accordingly, CMS voltage begins rising. At time t4, CMS voltage switches rich, and it is inferred that all of the oxygen stored at the catalyst has been consumed. An indication that all of the oxygen stored at the catalyst has been consumed may be understood to indicate that the catalyst is functioning as desired or expected.

Thus, based on the above, it may be understood that the CATMN diagnostic relies on a lean condition (no fueling) where the catalyst becomes saturated with oxygen and that then transitions to a rich condition (fueling activated). Alternatively, the DCMS monitor relies on a rich condition that transitions to a lean condition when fueling to engine cylinders is cut (e.g., at entry to a DFSO event). Other diagnostics mentioned above may be understood to rely on a condition where fueling is not provided to the engine, but where air flow from intake to exhaust is occurring. As discussed, the flow of air may be achieved by unfueled engine rotation.

Based on the above, it is herein recognized that it may be desirable to conduct the above-mentioned diagnostics according to a priority schedule, in order to enable the various diagnostics to complete in a time frame allotted (e.g., based on a DFSO event timeframe). Turning now to FIG. 12, depicted is an example timeline 1200, illustrating a DFSO event where an IPD event is commanded in order to conduct the above-mentioned diagnostics (e.g., DCMS, UEGO monitor, EGR monitor, particulate filter downstream hose diagnostic, and CATMN). For illustrative purposes, FIG. 12 depicts particular times when it may be desirable to acquire data related to the various monitors or diagnostics. Based on the particular times, a priority schedule may be established for enabling the diagnostics to be conducted responsive to a DFSO event.

Timeline 1200 includes plot 1205, indicating engine speed, over time. Timeline 1200 further includes plot 1210, indicating whether the electric motor is on, or off, over time. In this example timeline 1200, it may be understood that when the electric motor is "on", the electric motor may be rotating the engine unfueled in a forward, or default direction. Timeline 1200 further includes plot 1215, indicating whether fueling is being provided to engine cylinders (yes or no), over time.

Prior to time t0, fuel is being provided to engine cylinders (plot 1215), and the electric motor is off (plot 1210). Thus, it may be understood that the speed at which the engine is rotating (plot 1205) is based at least in part on the fueling provided to the engine.

At time t0, conditions are indicated to be met for initiating a DFSO event, and accordingly, fueling to engine cylinders is discontinued. Between time t0 and t1, with fueling of the engine discontinued, engine speed begins to drop. However, the controller requests an IPD event for this particular DFSO event, to enable diagnostics to be carried out, as discussed above. Accordingly, at time t1 the electric motor is commanded on in order to rotate the engine unfueled so as to generate air flow from the intake to exhaust of the engine so that the various diagnostics may be conducted.

The timeframe between time t1 and t2 reflects the stabilization period, where engine speed is controlled via the electric motor to the desired speed. In this example timeline 1200, the desired speed may be understood to be 900 RPM, although other speeds are within the scope of this disclosure. Between time t2 and t3, the electric motor is controlled to maintain engine speed at the desired speed. The timeframe between time t2 and t3 may be a predetermined duration, in some examples. In other examples, the timeframe between time t2 and t3 may be variable. For example, the timeframe may be greater or lesser depending on which diagnostics are desired to be conducted, etc.

At time t3, conditions are no longer met for rotating the engine unfueled, and accordingly the electric motor is commanded off. Accordingly, between time t3 and t4, the engine spins down to rest (e.g., 0 RPM). Time t4 represents a request from an operator of the vehicle for increased torque, where the request may include the operator stepping down on the accelerator pedal, for example. Accordingly, at time t4 the engine is once again commanded to receive fueling, and thus between time t4 and t5 the engine speed increases, and after time t5 it may be understood that engine speed is controlled as a function of driver demand.

As discussed above, the DCMS monitor relies on a rich to lean transition, which may occur when fueling to the engine is cut at initiation of a DFSO event. Accordingly, the DCMS monitor may have permission to run between time t0 and t3, as exemplified by arrow 1206. One or more of the UEGO sensor monitor, the EGR monitor, and the particulate filter downstream hose diagnostic may have permission to run between time t2 and t3, as exemplified by arrow 1207, when the electric motor is being used to rotate the engine unfueled to provide air flow for the diagnostics. Further, the CATMN diagnostic may have permission to run between time t2 and t5, as exemplified by arrow 1208, as the CATMN diagnostic relies on a transition from a lean to rich condition.

Thus, it is herein recognized that it may be possible to gather data related to the UEGO monitor, the EGR monitor and the particulate filter downstream hose diagnostic during the time period in which the engine is rotated unfueled to generate air flow for conducting the three diagnostics. Based on the diagnostics and how data is acquired for each of the diagnostics in order to indicate presence or absence of degradation, a priority schedule for conducting the various diagnostics may change during a course of a drive cycle, as will be elaborated in further detail below. Conducting a plurality of diagnostics during a single DFSO event (particularly with regard to the diagnostics conducted during the portion of the DFSO corresponding to the IPD portion) may reduce requests for IPD events. Reduction in IPD requests may save on battery power, which may in turn improve fuel economy, as opposed to a situation where individual IPD events are requested for conducting individual diagnostic monitors.

Turning to FIG. 13, example illustration 1300 depicts the number of times the particular diagnostics relevant to the present disclosure may be requested to be conducted prior to the controller making a determination as to a passing (e.g., indication of absence of degradation), or a failing (e.g., indication of presence of degradation) result for the particular diagnostic. Specifically, each fuel cut event may yield one valid test event for the various diagnostics, but some diagnostics may request more than one valid test event prior to a passing or failing decision is determined.

As depicted at FIG. 13, the DCMS monitor may have to be run three times before it may be inferred whether the CMS sensor is functioning as desired or expected. Along similar lines the EGR monitor may have to be run at least three times before enough data has been accumulated to enable the controller to infer a passing or failing result, and the CATMN diagnostic may too have to be run three times before enough data has been accumulated to enable the controller to infer a passing or failing result. Alternatively, each of the particular filter downstream hose diagnostic and the UEGO sensor diagnostic may be conducted just once in order for the controller to infer a passing or failing result for each of those diagnostics. It may be understood that it may not be possible to gather enough data in a single drive cycle to allow the controller to infer a passing or a failing result for, for example, monitors that have to be run a plurality of times (e.g., DCMS, EGR, CATMN). In such an example, the data may be stored such that the monitors that did not yield a passing or a failing result during the previous drive cycle may finish collecting data in a next or subsequent drive cycle. Furthermore, to improve completion rates for the above-mentioned diagnostics, once enough data for a particular diagnostic has been collected so as to enable the controller to make a decision, additional learn-ahead data may be collected at subsequent DFSO events in the same drive cycle, so as to improve chances of the particular diagnostic completing again in the next drive cycle. The collecting of learn-ahead data may be referred to herein as learn-ahead logic, and instructions for collecting learn-ahead data may be stored at the controller as instructions in non-transitory memory.

Based on the requested number of times particular diagnostics have to be run during DFSO events in order for the controller to establish a passing or failing result, and based on any potential interaction between how particular diagnostics are conducted, it may be desirable to run the diagnostics accordingly to a predetermined priority schedule. As discussed, by combining several diagnostics into a single DFSO events, a number of engine pulldown requests or DFSO events may be reduced for particular drive cycles and extra load on the electric motor may too be reduced.

FIG. 14 depicts a desired schedule for conducting the diagnostics relevant to the present disclosure, as illustrated by timeline 1400. Time is depicted on the x-axis, and individual DFSO events are depicted with respect to time. For each DFSO event, it may be understood that the general process flow in which monitors are conducted may follow the logic laid out above at FIG. 12. For each DFSO event, a priority schedule for conducting the diagnostics is illustrated, and the logic behind each priority schedule will be discussed below. With regard to FIG. 14, it may be understood that first priority (e.g., P1) may relate to that diagnostic being desired to be conducted first, that second priority (e.g., P2) may relate to that diagnostic being desired to be conducted second, that third priority (e.g., P3) may relate to that diagnostic being desired to be conducted third, and so on.

At time t0, it may be understood that a drive cycle has not yet been initiated, and the drive cycle begins at time t1. At time t2, conditions are met for initiating a first DFSO event. For the first DFSO event, the priority schedule is as follows. The DCMS monitor is of the highest priority (P1), the particulate filter downstream hose diagnostic is of the second highest priority (P2), the UEGO monitor is of the third highest priority (P3), the EGR monitor is of the fourth highest priority (P4), and the CATMN is of the fifth highest priority (P5). As discussed, the priority relates to the desired order in which the diagnostics are conducted. The DCMS diagnostic is of the highest priority, because as discussed, the DCMS diagnostic relies on a rich to lean transition, which may occur when fuel injection to the engine is initially cut (refer to the timeframe exemplified by arrow 1206 at FIG. 12). The particulate filter downstream hose diagnostic is of the second highest priority, based on the following logic. As discussed above with regard to FIGS. 9-10, the particulate filter downstream hose diagnostic relies on manipulation of exhaust backpressure. The manipulation of exhaust backpressure has the potential to influence other diagnostics that are desired to be conducted during the timeframe in which the electric motor is rotating the engine unfueled (e.g., refer to the timeframe between time t2 and t3 at FIG. 12). Because the particulate filter downstream hose diagnostic has to be conducted just once per drive cycle in order to infer whether the particulate filter downstream hose is disconnected, it may be desirable to quickly conduct this diagnostic after data has been collected for the DCMS monitor, to gather data for the particulate filter downstream hose diagnostic in a manner so as not to interfere with other diagnostics such as the UEGO and EGR diagnostics.

The UEGO diagnostic is another diagnostic that, as discussed at FIG. 13, has to be conducted just once in a drive cycle in order for the controller to infer a passing or a failing result. Accordingly, at the first DFSO event, the UEGO diagnostic is of the third priority, following the particulate filter downstream hose diagnostic.

As discussed above with regard to FIGS. 7A-8, the EGR monitor relies on measuring EGR flow rate and intake air flow. Thus, as mentioned, diagnostics such as the particulate filter downstream hose diagnostic that manipulates exhaust backpressure may have the potential to influence an outcome of the EGR monitor. Furthermore, because data from at least three DFSO events may be relied upon prior to inferring a passing or failing result of the EGR monitor, it may be thus desirable to quickly conduct diagnostics that have to be conducted just once for a call to be made for those diagnostics, thereby freeing up time during the remaining drive cycle to gather data for the EGR monitor without concern that another diagnostic (e.g., particulate filter downstream hose diagnostic) may undesirably influence the data collected for the EGR monitor. Thus, at the first DFSO event at time t2, the EGR monitor is of the fourth priority. Finally, the CATMN diagnostic is of the fifth priority. It may be understood that the CATMN diagnostic is of the fifth priority mainly because, as discussed above at FIG. 11, the CATMN diagnostic relies on a lean to rich transition. The lean to rich transition may occur, as discussed with regard to FIG. 12, responsive to fueling once again being provided to the engine after a DFSO event.

Continuing on with regard to the timeline of FIG. 14, at time t3 a second DFSO event is initiated. At the second DFSO event, the priority schedule for conducting the various monitors may be adjusted as compared to the first DFSO event, based on how the monitors/diagnostics for the first DFSO event were carried out. Specifically, the priority schedule for the various monitors for the second DFSO event are as follows. The DCMS monitor again has first priority (P1), given that the monitor relies on the rich to lean transition, as discussed. The EGR monitor is then given second highest priority (P2). The EGR monitor is given second highest priority because, as discussed above at FIG. 13, the controller can determine whether the EGR monitor passes (e.g., absence of degradation) or fails (e.g., presence of degradation) after three individual DFSO events. Because the particulate filter downstream hose diagnostic and UEGO diagnostic received higher priority during the first DFSO event, the EGR diagnostic is elevated to second priority at the second DFSO event.

At the second DFSO event, the UEGO monitor is given third highest priority (P3), and the particulate filter downstream hose diagnostic is given fourth highest priority (P4). It may be understood that even though just one DFSO event may be sufficient for the controller to make a call as to the passing or failing results of each of the UEGO and particulate filter downstream hose diagnostic, the controller may request additional data which may potentially be used for a subsequent UEGO and/or particulate filter downstream hose diagnostic. The additional data gathered may thus be understood to be "learn-ahead data."

Continuing on with regard to the timeline of FIG. 14, at time t4 a third DFSO event is initiated. The priority schedule for the third DFSO event may be updated as compared to the first DFSO event and the second DFSO event. For example, the DCMS monitor may be given the highest priority (P1), the EGR monitor may be given the second highest priority (P2), and the CATMN diagnostic may be given the third highest priority (P3). One caveat may be that in a case where learn-ahead data was not able to be obtained for the particulate filter downstream hose diagnostic and/or the UEGO monitor, then learn-ahead data may be requested for one or both of those monitors, where the priority schedule may be of a similar nature as that shown for the second DFSO event. However, in a case where sufficient learn-ahead data was captured for the UEGO and particulate filter downstream hose diagnostic, then the priority schedule may be of the nature depicted at FIG. 14 for the third DFSO event.

There may be advantages to just capturing the EGR monitor data at the third DFSO event where the engine is rotated unfueled for the EGR monitor. For example, an amount of time that the engine is rotated unfueled may be substantially less when just the EGR monitor is conducted during the IPD portion of the DFSO event, as compared to when each of the EGR monitor, particulate filter downstream hose diagnostic, and UEGO monitor are all requested. The reduction in time spent rotating the engine unfueled may conserve energy, thereby improving fuel economy.

With regard to the third DFSO event, it may be understood that similar to that discussed above, the DCMS monitor may be given first priority due to the conditions (e.g., rich to lean transition) under which the diagnostic may be conducted, relative to the DFSO event. Similar logic applies to the CATMN diagnostic, which may be given last (e.g., third) priority due to the conditions (e.g., lean to rich transition) under which the CATMN diagnostic can be conducted. In other words, it may not make sense to conduct other diagnostics prior to the DCMS monitor, because the DCMS monitor relies on the rich to lean transition that may occur responsive to fuel injection to the engine being discontinued. Similarly, it may not make sense to conduct other diagnostics subsequent to the CATMN diagnostic, because the CATMN diagnostic relies on the lean to rich transition that may occur responsive to fuel injection to the engine once again being initiated.

After the third DFSO event, it may be understood that the controller may have sufficient data collection to have made a passing or a failing call with regard to each of the DCMS monitor, particulate filter downstream hose diagnostic, UEGO monitor, EGR monitor, and CATMN diagnostic, based on the logic discussed above with regard to FIG. 13. Furthermore, learn-ahead data may have already been captured for the particulate filter downstream hose diagnostic and the UEGO monitor. However, it may be desirable to continue to obtain look-ahead data for the DCMS monitor, EGR monitor, and CATMN diagnostic. Accordingly, at the fourth DFSO event, the priority schedule is maintained similar to that discussed above for the third DFSO event.

It may be understood that the logic flow and the prioritization schemes depicted at FIG. 14 may represent a desired manner in which to carry out the diagnostics relevant to the present disclosure over the course of a particular drive cycle. However, it is herein recognized that there may be situations which may result in further adjustment to the logic flow presented at FIG. 14. For example, if the driver requests vehicle acceleration (e.g., tip-in) at the first DFSO event prior to the particulate filter downstream hose diagnostic being carried out, then a similar prioritization scheme scheduled for the first DFSO event may instead be commanded to be scheduled for the second DFSO event. In a case where the particulate filter downstream hose diagnostic was conducted at the first DFSO event but then a tip-in event occurred, thus preventing the UEGO diagnostic from being carried out, then the priority schedule for the second DFSO event may be shifted so that the DCMS diagnostic is again first priority, the UEGO monitor becomes second priority, the EGR monitor becomes third priority, learn-ahead data for the particulate filter diagnostic becomes fourth priority, and the catalyst monitor remains fifth priority. Such an example is meant to illustrate how the controller may change prioritization scheduling based on outcomes of scheduled diagnostics for particular DFSO events, in order to effectively complete the diagnostics of the present disclosure in a manner that saves on energy usage, a key aspect of hybrid electric vehicle control strategy.

Furthermore, it may be understood that there may be other reasons (as opposed to driver tip-in requests) why a particular diagnostic cannot be conducted for a particular DFSO event, which may thus make it necessary to adjust the diagnostic prioritization scheme depicted at FIG. 14. For example, each monitor may include a set of entry conditions that have to be met for conducting the particular diagnostic monitor. In a case where entry conditions are not met for a particular monitor, then the diagnostic may not be able to be conducted, and the prioritization schedule may have to be adjusted for the current and subsequent DFSO events.

In yet another example, in response to a particular diagnostic indicating a presence of degradation, that particular diagnostic may no longer be included in the prioritization scheme, and prioritization of the other diagnostics may be updated accordingly. For example, in a situation where the particulate filter downstream hose is indicated to be disconnected at the first DFSO event, then rather than obtaining additional learn-ahead data at the second DFSO event, the priority schedule for the second DFSO event may be updated so as to avoid conducting the particulate filter downstream hose diagnostic, and instead the CATMN diagnostic may receive the fourth highest priority.

Turning now to FIG. 15, depicted is a high-level example method 1500, illustrating how a controller of a vehicle may conduct a plurality of diagnostics during DFSO events during a drive cycle. Specifically, at least one of the diagnostics may rely on a rich to lean transition (e.g., DCMS monitor), at least one of the diagnostics may rely on a lean to rich transition (e.g., CATMN diagnostic), and a plurality of other diagnostics may rely on a steady-state airflow from an intake of the engine to the exhaust of the engine, the airflow provided via rotating the engine unfueled in a forward or default direction. The plurality of diagnostics may follow a predetermined priority schedule for each DFSO event, where the predetermined priority schedule may be adjusted depending on whether the desired diagnostics for particular DFSO events have been carried out as desired or not.

Instructions for carrying out method 1500 and the rest of the methods included herein may be executed by the controller (e.g., controller 12 at FIG. 1) based on instructions stored on a memory of the controller and in conjunction with signals received from sensors of the engine system, such as the sensors described above with reference to FIGS. 1-3. The controller may employ actuators of the engine (e.g., engine 10 at FIG. 1) to alter states of devices in the physical world, according to the methods described below.

It may be understood that method 1500 may be initiated at the start of a vehicle drive cycle. A vehicle drive cycle may be initiated at a key-on event of the vehicle, for example. In other examples, a drive cycle may be initiated by a vehicle operator requesting a remote start of the vehicle, via the vehicle-operator depressing a button at the dash to start the vehicle, etc.

At 1505, method 1500 includes indicating if a first DFSO event (e.g., first DFSO event of the current drive cycle) is requested. A DFSO event may be requested in response to the vehicle operator lifting their foot off the accelerator pedal, in one example. Additionally or alternatively, the DFSO event may be requested responsive to the vehicle operator requesting braking of the vehicle. If a DFSO event is not initiated at 1505, method 1500 proceeds to 1510 where current operating parameters may be maintained. For example, engine operation may be maintained in its current operational state. Specifically, the engine may be maintained being fueled, or in a case where the engine is off (e.g., where the vehicle is being propelled solely via electric power), the engine may be maintained off. While not explicitly illustrated at method 1500, it may be understood that method 1500 may end at any time responsive to a vehicle shutdown event being indicated.

Responsive to the first DFSO event being indicated, method 1500 proceeds to 1515. At 1515, method 1500 includes conducting diagnostics according to a first prioritization schedule. The first prioritization schedule may be the first prioritization schedule discussed above at FIG. 14, specifically the prioritization schedule depicted at time t2 of timeline 1400.

With the diagnostics conducted at 1515, method 1500 proceeds to 1520. At 1520, method 1500 includes indicating whether a second DFSO event is indicated. If not, method 1500 proceeds to 1525, where current operating parameters are maintained. Alternatively, responsive to the second DFSO event being indicated, method 1500 proceeds to 1530. At 1530, method 1500 includes conducting diagnostics according to a second prioritization schedule. The second prioritization schedule may be the second prioritization schedule discussed above at FIG. 14, specifically the prioritization schedule depicted at time t3 of timeline 1400.

With the diagnostics conducted at 1530, method 1500 proceeds to 1535. At 1535, method 1500 includes indicating whether a third DFSO event is indicated. If not, method 1500 proceeds to 1540, where current operating parameters are maintained. Alternatively, responsive to the third DFSO event being indicated, method 1500 proceeds to 1545. At 1545, method 1500 includes conducting diagnostics according to a third prioritization schedule. The third prioritization schedule may be the third prioritization schedule discussed at FIG. 14, specifically the prioritization schedule depicted at time t4 of timeline 1400.

With the diagnostics conducted at 1545, method 1500 proceeds to 1550. At 1550, method 1500 includes indicating whether a fourth DFSO event is indicated. If not, method 1500 proceeds to 1555, where current operating parameters are maintained. Alternatively, responsive to the fourth DFSO event being indicated, method 1500 proceeds to 1560, where method 1500 includes conducting diagnostics according to a fourth prioritization schedule. The fourth prioritization schedule may be the fourth prioritization schedule discussed at FIG. 14, specifically the prioritization schedule depicted at time t5 of timeline 1400.

It may be understood that steps 1505-1560 may represent a desired manner in which to conduct the plurality of diagnostics relevant to the present disclosure. However, as mentioned above, there may be circumstances that may cause the controller to make adjustments to the desired manner in which the plurality of diagnostics are conducted. Thus, in some examples the first prioritization schedule may not comprise the first prioritization schedule depicted at FIG. 14, if some condition such as a tip-in event, or a failure of one or more diagnostics to meet corresponding entry conditions, prevent the first prioritization schedule from being carried out as desired. In such an example, it may be understood that the second prioritization schedule may be modified by the controller, taking into account the diagnostics that failed to be conducted, which were partially conducted, or which diagnostic(s) did not pass at the first DFSO event. Along similar lines, if the second prioritization schedule is adjusted, then the third prioritization schedule may correspondingly be adjusted, and so on as to enable the desired diagnostics to be completed for the current drive cycle. Similar logic applies to a situation where the first prioritization schedule was carried out as desired at the first DFSO event, but where the second prioritization schedule did not get conducted as desired. In such a case, the third prioritization schedule may be appropriately adjusted and, and so on.

Thus, based on the above, there may be certain circumstances where additional diagnostics (e.g., one or more of DCMS, particulate filter downstream hose diagnostic, EGR monitor, UEGO monitor, CATMN) are requested at 1565. Under a situation where the diagnostics are carried out in a manner desired, for example as discussed in detail with regard to the timeline of FIG. 14, then method 1500 may proceed to 1575, where method 1500 includes updating vehicle operating parameters. For example, the controller may update particular parameters based on the outcome of completed diagnostic tests, and method 1500 may end. Alternatively, if additional diagnostics are requested, then method 1500 may proceed to 1570, where additional diagnostics may be conducted according to an updated prioritization schedule, where the updated prioritization schedule accounts for which diagnostics have not been conducted according to the desired schedule, such that the diagnostics may be carried out at any further DFSO events. In some examples, the controller may request an engine pulldown event (and in some examples an IPD event for the requested engine pulldown event) so as to conduct the additional one or more diagnostics that have not been effectively conducted prior to step 1570.

In this way, completion rates for diagnostic monitors for hybrid electric vehicles may be improved. Improving completion rates may in turn improve customer satisfaction, by reducing time spent having to have the vehicle diagnosed for trouble codes issued due to one or more diagnostic monitors failing to be conducted as desired or expected.

The technical effect of conducting a plurality of diagnostics during a timeframe in which an engine of a hybrid electric vehicle is rotated unfueled is that engine inhibit pulldown (IPD) events may be conducted less frequently in a drive cycle, as opposed to requesting different IPD events for each desired diagnostic. Reducing a number of IPD events may reduce an amount of battery power that is used to rotate the engine unfueled for conducting particular requested diagnostics, which may in turn improve fuel economy. In this way, completion rates for diagnostics that are mandated to be conducted for hybrid electric vehicles may be improved.

The systems and methods discussed herein may enable one or more systems and one or more methods. In one example, a method comprises in response to fueling of an engine of a vehicle being discontinued due to a first vehicle deceleration request, maintaining the engine rotating to provide an air flow from an intake of the engine to an exhaust of the engine; and conducting a plurality of diagnostic monitors that rely on the air flow while the engine is rotating prior to reactivation of fueling of the engine. In a first example of the method, the method further includes wherein maintaining the engine rotating includes commanding an electric motor to rotate the engine unfueled for a predetermined duration, and then discontinuing rotating the engine unfueled so the engine spins to rest responsive to the predetermined duration elapsing. A second example of the method optionally includes the first example, and further includes wherein the predetermined duration is selected as a function of the plurality of diagnostic monitors to be conducted. A third example of the method optionally includes any one or more or each of the first through second examples, and further includes wherein maintaining the engine rotating includes rotating the engine at a predetermined speed. A fourth example of the method optionally includes any one or more or each of the first through third examples, and further includes wherein the predetermined speed is a speed between 600 RPM and 2000 RPM. A fifth example of the method optionally includes any one or more or each of the first through fourth examples, and further comprises conducting the plurality of diagnostic monitors according to a prioritization schedule where each of the plurality of diagnostic monitors is assigned a priority that dictates an order in which each of the plurality of diagnostic monitors is conducted. A sixth example of the method optionally includes any one or more or each of the first through fifth examples, and further comprises adjusting the prioritization schedule for conducting the plurality of diagnostic monitors responsive to a subsequent vehicle deceleration request during a same drive cycle as the first vehicle deceleration request. A seventh example of the method optionally includes any one or more or each of the first through sixth examples, and further includes wherein adjusting the prioritization schedule is based on a determination of degradation inferred by one or more of the plurality of diagnostic monitors. An eighth example of the method optionally includes any one or more or each of the first through seventh examples, and further includes wherein adjusting the prioritization schedule is based on one or more of the plurality of diagnostic monitors being interrupted by a vehicle acceleration request. A ninth example of the method optionally includes any one or more or each of the first through eighth examples, and further includes wherein adjusting the prioritization schedule is based on a number of times during a drive cycle that each of the plurality of diagnostics is requested to be conducted.

Another example of a method comprises in response to fueling of an engine of a vehicle being discontinued, inhibiting the engine spinning to rest by commanding the engine to rotate unfueled at a predetermined speed for a predetermined duration; manipulating a pressure in an exhaust system of the engine while the engine is rotating unfueled; and inferring whether a downstream hose that couples a differential pressure sensor to a position downstream of a gasoline particulate filter is disconnected based on an actual pressure differential across the gasoline particulate filter monitored via the differential pressure sensor while the pressure in the exhaust system is manipulated. In a first example of the method, the method further includes wherein manipulating the pressure in the exhaust system includes alternating between a closed position and an open position of a valve included in the exhaust. A second example of the method optionally includes the first example, and further includes wherein the valve is an exhaust gas heat retention valve that is used to selectively bypass or route exhaust gas through a heat exchanger included in a heat recovery conduit included in the exhaust system. A third example of the method optionally includes any one or more or each of the first through second examples, and further includes wherein the valve is an exhaust gas tuning valve that is used to selectively bypass or route exhaust gas through a muffler included in the exhaust system. A fourth example of the method optionally includes any one or more or each of the first through third examples, and further comprises inferring the downstream hose is disconnected in response to the actual pressure differential exceeding a predetermined threshold pressure differential responsive to the pressure being manipulated; and in response to an indication that the downstream hose is connected or disconnected, stopping manipulating the pressure and proceeding to conduct one or more additional diagnostics that additionally rely on an air flow produced by the engine rotating unfueled for the predetermined duration.

An example of a system for a hybrid electric vehicle comprises an engine with an intake and an exhaust, the engine capable of being rotated unfueled via an electric motor; and a controller with computer readable instructions stored on non-transitory memory that when executed, cause the controller to: in response to a vehicle deceleration request, discontinue fueling the engine, conduct an initial diagnostic monitor that relies on a rich-to-lean transition, then conduct a plurality of intermediate diagnostic monitors that rely on an air flow from the intake to the exhaust established via unfueled engine rotation via the electric motor; discontinue rotating the engine unfueled subsequent to the plurality of intermediate diagnostic monitors being conducted; and in response to an acceleration request subsequent to discontinuing rotating the engine unfueled, conduct a final diagnostic that relies on a lean-to-rich transition. In a first example of the system, the system further comprises a catalyst monitor sensor positioned in the exhaust; and wherein the controller stores further instructions to conduct the initial diagnostic by inferring a slew rate that is based on when a voltage of the catalyst monitor sensor drops below a rich threshold and then a lean threshold, and determining if the catalyst monitor sensor is functioning as desired or expected based on the slew rate. A second example of the system optionally includes the first example, and further comprises a gasoline particulate filter and a particulate filter pressure sensor configured to measure a differential pressure across the gasoline particulate filter, the particulate filter pressure sensor coupled at a first position upstream of the gasoline particulate filter via an upstream hose and coupled at a second position downstream of the gasoline particulate filter via a downstream hose; an exhaust gas recirculation passage that includes an exhaust gas recirculation valve for routing exhaust gas from the exhaust to the intake of the engine; a universal exhaust gas oxygen sensor positioned in the exhaust upstream of the gasoline particulate filter; wherein the plurality of intermediate diagnostic monitors include a gasoline particulate filter downstream hose diagnostic for inferring whether the downstream hose is disconnected, an exhaust gas recirculation diagnostic for inferring whether the exhaust gas recirculation valve is degraded, and a universal exhaust gas oxygen sensor diagnostic for inferring whether the universal exhaust gas oxygen sensor is degraded; and wherein each of the plurality of intermediate diagnostic monitors are assigned a priority that determines an order in which the plurality of intermediate diagnostic monitors are conducted. A third example of the system optionally includes any one or more or each of the first through second examples, and further includes wherein the controller stores further instructions to adjust the priority for a subsequent vehicle deceleration request occurring in a same drive cycle as the vehicle deceleration request. A fourth example of the system optionally includes any one or more or each of the first through third examples, and further comprises a catalyst positioned in the exhaust; and wherein the controller stores further instructions to conduct the final diagnostic by inferring an amount of fuel that it takes to drive the catalyst to a rich condition when starting from an oxygen-saturated, lean condition.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
in response to fueling of an engine of a vehicle being discontinued due to a first vehicle deceleration request, maintaining the engine rotating to provide an air flow from an intake of the engine to an exhaust of the engine;
conducting an initial diagnostic monitor that relies on a rich-to-lean transition;
conducting a plurality of intermediate diagnostic monitors that rely on the air flow while the engine is rotating prior to reactivation of fueling of the engine; and
in response to the reactivation of fueling of the engine, conduct a final diagnostic that relies on another lean-to-rich transition.

2. The method of claim 1, wherein maintaining the engine rotating includes commanding an electric motor to rotate the engine unfueled for a predetermined duration, and then discontinuing rotating the engine unfueled so the engine spins to rest responsive to the predetermined duration elapsing.

3. The method of claim 2, wherein the predetermined duration is selected as a function of the plurality of intermediate diagnostic monitors to be conducted.

4. The method of claim 2, wherein maintaining the engine rotating includes rotating the engine at a predetermined speed.

5. The method of claim 4, wherein the predetermined speed is a speed between 600 RPM and 2000 RPM.

6. The method of claim 1, further comprising conducting the plurality of intermediate diagnostic monitors according to a prioritization schedule where each of the plurality of intermediate diagnostic monitors is assigned a priority that dictates an order in which each of the plurality of intermediate diagnostic monitors is conducted.

7. The method of claim 6, further comprising adjusting the prioritization schedule for conducting the plurality of intermediate diagnostic monitors responsive to a subsequent vehicle deceleration request during a same drive cycle as the first vehicle deceleration request.

8. The method of claim 7, wherein adjusting the prioritization schedule is based on a determination of degradation inferred by one or more of the plurality of intermediate diagnostic monitors.

9. The method of claim 7, wherein adjusting the prioritization schedule is based on one or more of the plurality of intermediate diagnostic monitors being interrupted by a vehicle acceleration request.

10. The method of claim 7, wherein adjusting the prioritization schedule is based on a number of times during a drive cycle that each of the plurality of intermediate diagnostics is requested to be conducted.

11. A method comprising:
in response to fueling of an engine of a vehicle being discontinued, inhibiting the engine spinning to rest by commanding the engine to rotate unfueled at a predetermined speed for a predetermined duration;
manipulating a pressure in an exhaust system of the engine while the engine is rotating unfueled; and
inferring whether a downstream hose that couples a differential pressure sensor to a position downstream of a gasoline particulate filter is disconnected based on an actual pressure differential across the gasoline particulate filter monitored via the differential pressure sensor while the pressure in the exhaust system is manipulated.

12. The method of claim 11, wherein manipulating the pressure in the exhaust system includes alternating between a closed position and an open position of a valve included in the exhaust.

13. The method of claim 12, wherein the valve is an exhaust gas heat retention valve that is used to selectively bypass or route exhaust gas through a heat exchanger included in a heat recovery conduit included in the exhaust system.

14. The method of claim 12, wherein the valve is an exhaust gas tuning valve that is used to selectively bypass or route exhaust gas through a muffler included in the exhaust system.

15. The method of claim 11, further comprising inferring the downstream hose is disconnected in response to the actual pressure differential exceeding a predetermined threshold pressure differential responsive to the pressure being manipulated; and
in response to an indication that the downstream hose is connected or disconnected, stopping manipulating the pressure and proceeding to conduct one or more additional diagnostics that additionally rely on an air flow produced by the engine rotating unfueled for the predetermined duration.

16. A system for a hybrid electric vehicle, comprising:
an engine with an intake and an exhaust, the engine capable of being rotated unfueled via an electric motor; and
a controller with computer readable instructions stored on non-transitory memory that when executed, cause the controller to:
in response to a vehicle deceleration request, discontinue fueling the engine, conduct an initial diagnostic monitor that relies on a rich-to-lean transition, then conduct a plurality of intermediate diagnostic monitors that rely on an air flow from the intake to the exhaust established via unfueled engine rotation via the electric motor;
discontinue rotating the engine unfueled subsequent to the plurality of intermediate diagnostic monitors being conducted; and
in response to an acceleration request subsequent to discontinuing rotating the engine unfueled, conduct a final diagnostic that relies on a lean-to-rich transition.

17. The system of claim 16, further comprising a catalyst monitor sensor positioned in the exhaust; and
wherein the controller stores further instructions to conduct the initial diagnostic by inferring a slew rate that is based on when a voltage of the catalyst monitor sensor drops below a rich threshold and then a lean threshold, and determining if the catalyst monitor sensor is functioning as desired or expected based on the slew rate.

18. The system of claim 16, further comprising:
a gasoline particulate filter and a particulate filter pressure sensor configured to measure a differential pressure across the gasoline particulate filter, the particulate filter pressure sensor coupled at a first position upstream of the gasoline particulate filter via an upstream hose and coupled at a second position downstream of the gasoline particulate filter via a downstream hose;
an exhaust gas recirculation passage that includes an exhaust gas recirculation valve for routing exhaust gas from the exhaust to the intake of the engine;
a universal exhaust gas oxygen sensor positioned in the exhaust upstream of the gasoline particulate filter;
wherein the plurality of intermediate diagnostic monitors include a gasoline particulate filter downstream hose diagnostic for inferring whether the downstream hose is disconnected, an exhaust gas recirculation diagnostic for inferring whether the exhaust gas recirculation valve is degraded, and a universal exhaust gas oxygen sensor diagnostic for inferring whether the universal exhaust gas oxygen sensor is degraded; and
wherein each of the plurality of intermediate diagnostic monitors are assigned a priority that determines an order in which the plurality of intermediate diagnostic monitors are conducted.

19. The system of claim 18, wherein the controller stores further instructions to adjust the priority for a subsequent vehicle deceleration request occurring in a same drive cycle as the vehicle deceleration request.

20. The system of claim 16, further comprising a catalyst positioned in the exhaust; and
wherein the controller stores further instructions to conduct the final diagnostic by inferring an amount of fuel that it takes to drive the catalyst to a rich condition when starting from an oxygen-saturated, lean condition.

\* \* \* \* \*